US009572129B2

(12) United States Patent
Ma et al.

(10) Patent No.: US 9,572,129 B2
(45) Date of Patent: Feb. 14, 2017

(54) COMMUNICATIONS METHOD AND APPARATUS

(71) Applicant: Huawei Technologies Co., Ltd., Shenzhen, Guangdong (CN)

(72) Inventors: Hui Ma, Shenzhen (CN); Zhuo Chen, Shenzhen (CN); Yongqiang Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/870,508

(22) Filed: Sep. 30, 2015

(65) Prior Publication Data
US 2016/0021639 A1  Jan. 21, 2016

Related U.S. Application Data

(63) Continuation of application No. PCT/CN2013/073814, filed on Apr. 7, 2013.

(51) Int. Cl.
*H04W 68/00* (2009.01)
*H04W 52/02* (2009.01)
(Continued)

(52) U.S. Cl.
CPC ........... *H04W 68/005* (2013.01); *H04W 8/24* (2013.01); *H04W 52/0216* (2013.01);
(Continued)

(58) Field of Classification Search
None
See application file for complete search history.

(56) References Cited

U.S. PATENT DOCUMENTS

2012/0155351 A1  6/2012  Lee et al.
2015/0133126 A1*  5/2015  Liu ............... H04W 36/0072
                                                    455/437

(Continued)

FOREIGN PATENT DOCUMENTS

CN    102014103 A    4/2011
CN    102257859 A    11/2011

(Continued)

OTHER PUBLICATIONS

"3rd Generation Partnership Project; Technical Specification Group Core Network and Terminals; Restoration procedures (Release 12)", 3GPP TS 23.007 V12.0.0, Mar. 2013, 72 pages.

(Continued)

*Primary Examiner* — Diane Mizrahi

(57) ABSTRACT

Embodiments of the present invention relate to the field of communications, and provide a communications method and apparatus, which can solve a problem in the prior art that, in order to save power, when a mobility management entity (MME) delays delivering a paging message or a UE uses a long discontinuous reception (DRX) period, an exception may occur in a serving gateway (SGW). The method includes: acquiring, by an MME, information of a UE (S101); determining, by the MME according to the information, whether the UE satisfies a first preset condition (S102); if the UE satisfies the first preset condition, generating, by the MME, a first indication, where the first indication is used for instructing an SGW to retain first data or discard first data, and the first data is downlink data of the UE (S103); and sending, by the MME, the first indication to the SGW.

18 Claims, 9 Drawing Sheets

(51) Int. Cl.
H04W 8/24 (2009.01)
H04W 76/04 (2009.01)
(52) U.S. Cl.
CPC ..... *H04W 52/0229* (2013.01); *H04W 76/048* (2013.01); *Y02B 60/50* (2013.01)

(56) References Cited

U.S. PATENT DOCUMENTS

2015/0163745 A1* 6/2015 Kim .................. H04W 52/0235
370/311
2016/0081081 A1* 3/2016 Xu ........................ H04W 76/00
370/329

FOREIGN PATENT DOCUMENTS

EP   2 237 574 A1   10/2010
WO   WO 2011/154761 A1   12/2011

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.0.0, Mar. 2013, 290 pages.

* cited by examiner

COMMUNICATIONS METHOD AND APPARATUS

CROSS REFERENCE TO RELATED APPLICATIONS

This application is a continuation of International Application No. PCT/CN2013/073814, filed on Apr. 7, 2013, which is hereby incorporated by reference in its entirety.

TECHNICAL FIELD

The present invention relates to the field of communications, and in particular, to a communications method and apparatus.

BACKGROUND

M2M (Machine to Machine, machine to machine) is widely applied in multiple fields, such as intelligent traffic, a building automation system, and a video surveillance system. An M2M device basically adopts a battery powered system, and one surveillance network has tens of thousands of M2M devices; therefore, a work load of changing batteries for these M2M devices is quite heavy, so that people expect that an M2M device has low power consumption and long standby time, thereby reducing the number of times of battery change.

For a UE (User Equipment, user equipment) serving as an M2M device, power consumed in an idle state is far less than power consumed in a connected state, and most power consumption in the idle state originates from switching of the UE from the idle state to the connected state.

In the prior art, in order to reduce power consumption of a UE and increase standby time of the UE, a UE in an idle state usually receives a paging message from a network in a DRX (Discontinuous Reception, discontinuous reception) manner, so as to reduce the number of switches of the UE from the idle state to a connected state, thereby achieving an objective of saving power. Meanwhile, when an MME (Mobility Management Entity, mobility management entity) learns that an SGW (Serving Gateway, serving gateway) buffers downlink data that needs to be sent to the UE, the MME delays delivering the paging message to the UE or further increases a DRX period of the UE, so as to further reduce the number of switches of the UE from the idle state to the connected state, to enable the UE to remain in the idle state as far as possible, thereby further reducing power consumption of the UE and achieving an objective of saving power.

However, when the MME delays delivering the paging message or the UE uses a long DRX period, because the UE needs to wait for a long time each time before the UE receives the paging message from the MME, establishes a connection to the network according to the paging message, and receives corresponding downlink data, it is possible that an SGW/a PGW (Packet Data Network Gateway, Packet Data Network Gateway) cannot receive connection establishment information of the UE within a normal time interval, and cannot deliver downlink data of the UE to the UE, so that the SGW may mistakenly consider that an error or exception occurs in the network, and further discard the buffered downlink data of the UE.

SUMMARY

Embodiments of the present invention provide a communications method and apparatus, which can solve a problem in the prior art that, in order to save power, when an MME delays delivering a paging message or a UE uses a long DRX period, an exception may occur in an SGW.

In order to achieve the foregoing objective, the following technical solutions are used in the embodiments of the present invention.

According to a first aspect, an embodiment of the present invention provides a communications method, including:

acquiring, by a mobility management entity MME, information of a user equipment UE;

determining, by the MME according to the information of the UE, whether the UE satisfies a first preset condition;

if the UE satisfies the first preset condition, generating, by the MME, a first indication, where the first indication is used for instructing a serving gateway SGW to retain first data or discard the first data, and the first data is downlink data of the UE; and sending, by the MME, the first indication to the SGW, so that the SGW processes the first data according to the first indication.

In a first possible implementation manner of the first aspect, the information of the UE includes a type of the UE; the first preset condition is that the UE is a power-saving UE; and the determining, by the MME according to the information of the UE, whether the UE satisfies a first preset condition includes:

determining, by the MME according to the type of the UE, whether the UE is the power-saving UE.

In a second possible implementation manner of the first aspect, the information of the UE includes a discontinuous reception DRX period of the UE; the first preset condition is that the DRX period of the UE is greater than a first preset threshold; and the determining, by the MME according to the information of the UE, whether the UE satisfies a first preset condition includes:

determining, by the MME according to the DRX period of the UE, whether the DRX period of the UE is greater than the first preset threshold.

With reference to the first aspect, or either of the first possible implementation manner and the second possible implementation manner of the first aspect, in a third possible implementation manner, the first indication includes a first paging delaying instruction, and is used for instructing the SGW to determine a first time according to the first paging delaying instruction and retain the first data within the first time, or is used for instructing the SGW to discard the first data according to the first paging delaying instruction;

or, the first indication includes a first suggested waiting time, and is used for instructing the SGW to retain the first data within the first suggested waiting time;

or, the first indication includes the first paging delaying instruction and the first suggested waiting time, and is used for instructing the SGW to retain the first data within the first suggested waiting time after the SGW determines, according to the first paging delaying instruction, that the MME needs to delay paging the UE;

or, the first indication includes the first paging delaying instruction and an evolved packet system EPS bearer identifier, and is used for instructing the SGW to determine the first time according to the first paging delaying instruction and retain, within the first time, the first data corresponding to the EPS bearer identifier, or is used for instructing the SGW to discard, according to the first paging delaying instruction, the first data corresponding to the EPS bearer identifier;

or, the first indication includes the first suggested waiting time and the EPS bearer identifier, and is used for instructing the SGW to retain, within the first suggested waiting time, the first data corresponding to the EPS bearer identifier;

or, the first indication includes the first paging delaying instruction, the first suggested waiting time, and the EPS bearer identifier, and is used for instructing the SGW to retain, within the first suggested waiting time, the first data corresponding to the EPS bearer identifier after the SGW determines, according to the first paging delaying instruction, that the MME needs to delay paging the UE.

With reference to the first aspect, or any one of the first possible implementation manner to the third possible implementation manner of the first aspect, in a fourth possible implementation manner, the method for acquiring, by a mobility management entity MME, information of a user equipment UE includes:

receiving, by the MME, subscription data of the UE from a home subscriber server HSS, and acquiring the information of the UE according to the subscription data of the UE;

or, receiving, by the MME, a non access stratum NAS message/an access stratum AS message from the UE, and acquiring the information of the UE according to the NAS message/AS message of the UE;

or, acquiring, by the MME, the information of the UE according to a pre-configured quality of service QoS parameter of a bearer used by the UE.

With reference to the fourth possible implementation manner of the first aspect, in a fifth possible implementation manner, the method further includes:

if the subscription data of the UE, the QoS parameter of the bearer used by the UE, or a state of the UE changes, generating, by the MME, a second indication according to subscription data of the UE, a QoS parameter of the bearer used by the UE, or a state of the UE that is obtained after the change, where the second indication is used for instructing the SGW to normally transmit and receive the first data; and sending, by the MME, the second indication to the SGW, so that the SGW processes the first data according to the second indication.

According to a second aspect, an embodiment of the present invention further provides a communications method, including:

receiving, by an SGW, a first indication from an MME, where the first indication is generated by the MME when the MME acquires information of a UE and determines, according to the information of the UE, that the UE satisfies a first preset condition, the first indication is used for instructing the SGW to retain first data or discard the first data, and the first data is downlink data of the UE; and processing, by the SGW, the first data according to the first indication.

In a first possible implementation manner of the second aspect, the first indication includes a first paging delaying instruction, and is used for instructing the SGW to determine a first time according to the first paging delaying instruction and retain the first data within the first time, or is used for instructing the SGW to discard the first data according to the first paging delaying instruction;

or, the first indication includes a first suggested waiting time, and is used for instructing the SGW to retain the first data within the first suggested waiting time;

or, the first indication includes the first paging delaying instruction and the first suggested waiting time, and is used for instructing the SGW to retain the first data within the first suggested waiting time after the SGW determines, according to the first paging delaying instruction, that the MME needs to delay paging the UE;

or, the first indication includes the first paging delaying instruction and an EPS bearer identifier, and is used for instructing the SGW to determine the first time according to the first paging delaying instruction and retain, within the first time, the first data corresponding to the EPS bearer identifier, or is used for instructing the SGW to discard, according to the first paging delaying instruction, the first data corresponding to the EPS bearer identifier;

or, the first indication includes the first suggested waiting time and the EPS bearer identifier, and is used for instructing the SGW to retain, within the first suggested waiting time, the first data corresponding to the EPS bearer identifier;

or, the first indication includes the first paging delaying instruction, the first suggested waiting time, and the EPS bearer identifier, and is used for instructing the SGW to retain, within the first suggested waiting time, the first data corresponding to the EPS bearer identifier after the SGW determines, according to the first paging delaying instruction, that the MME needs to delay paging the UE.

With reference to the second aspect or the first possible implementation manner of the second aspect, in a second possible implementation manner, the method further includes:

receiving, by the SGW, a second indication from the MME, where the second indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the second indication is used for instructing the SGW to normally transmit and receive the first data; and processing, by the SGW, the first data according to the second indication.

According to a third aspect, an embodiment of the present invention provides an MME, including:

a first acquiring unit, configured to acquire information of a UE;

a first determining unit, configured to determine, according to the information of the UE acquired by the first acquiring unit, whether the UE satisfies a first preset condition;

a first generating unit, configured to: if the first determining unit determines that the UE satisfies the first preset condition, generate a first indication, where the first indication is used for instructing an SGW to retain first data or discard the first data, and the first data is downlink data of the UE; and a first sending unit, configured to send the first indication generated by the first generating unit to the SGW, so that the SGW processes the first data according to the first indication.

In a first possible implementation manner of the third aspect, the information of the UE acquired by the first acquiring unit includes a type of the UE; the first preset condition is that the UE is a power-saving UE; and the first determining unit is configured to determine, according to the type of the UE, whether the UE is the power-saving UE.

In a second possible implementation manner of the third aspect, the information of the UE acquired by the first acquiring unit includes a DRX period of the UE; the first preset condition is that the DRX period of the UE is greater than a first preset threshold; and the first determining unit is configured to determine, according to the DRX period of the UE, whether the DRX period of the UE is greater than the first preset threshold.

With reference to the third aspect, or either of the first possible implementation manner and the second possible implementation manner of the third aspect, in a third possible implementation manner, the first indication generated by the first generating unit includes a first paging delaying instruction, and is used for instructing the SGW to determine a first time according to the first paging delaying instruction and retain the first data within the first time, or is used for instructing the SGW to discard the first data according to the first paging delaying instruction;

or, the first indication generated by the first generating unit includes a first suggested waiting time, and is used for instructing the SGW to retain the first data within the first suggested waiting time;

or, the first indication generated by the first generating unit includes the first paging delaying instruction and the first suggested waiting time, and is used for instructing the SGW to retain the first data within the first suggested waiting time after the SGW determines, according to the first paging delaying instruction, that the MME needs to delay paging the UE;

or, the first indication generated by the first generating unit includes the first paging delaying instruction and an EPS bearer identifier, and is used for instructing the SGW to determine the first time according to the first paging delaying instruction and retain, within the first time, the first data corresponding to the EPS bearer identifier, or is used for instructing the SGW to discard, according to the first paging delaying instruction, the first data corresponding to the EPS bearer identifier;

or, the first indication generated by the first generating unit includes the first suggested waiting time and the EPS bearer identifier, and is used for instructing the SGW to retain, within the first suggested waiting time, the first data corresponding to the EPS bearer identifier;

or, the first indication generated by the first generating unit includes the first paging delaying instruction, the first suggested waiting time, and the EPS bearer identifier, and is used for instructing the SGW to retain, within the first suggested waiting time, the first data corresponding to the EPS bearer identifier after the SGW determines, according to the first paging delaying instruction, that the MME needs to delay paging the UE.

With reference to the third aspect, or any one of the first possible implementation manner to the third possible implementation manner of the third aspect, in a fourth possible implementation manner, the MME further includes:

a first receiving unit, configured to receive subscription data of the UE from an HSS;

where the first acquiring unit is configured to acquire the information of the UE according to the subscription data of the UE received by the first receiving unit;

or, the first receiving unit is configured to receive a NAS message/an AS message from the UE, and the first acquiring unit is configured to acquire the information of the UE according to the NAS message/AS message of the UE received by the first receiving unit;

or, the first acquiring unit is configured to acquire the information of the UE according to a pre-configured QoS parameter of a bearer used by the UE.

With reference to the fourth possible implementation manner of the third aspect, in a fifth possible implementation manner, the first generating unit is further configured to: if the subscription data of the UE, the QoS parameter of the bearer used by the UE, or a state of the UE changes, generate a second indication according to subscription data of the UE, a QoS parameter of the bearer used by the UE, or a state of the UE that is obtained after the change, where the second indication is used for instructing the SGW to normally transmit and receive the first data; and the first sending unit is further configured to send the second indication generated by the first generating unit to the SGW, so that the SGW processes the first data according to the second indication.

According to a fourth aspect, an embodiment of the present invention provides an SGW, including:

a second receiving unit, configured to receive a first indication from an MME, where the first indication is generated by the MME when the MME acquires information of a UE and determines, according to the information of the UE, that the UE satisfies a first preset condition, the first indication is used for instructing the SGW to retain first data or discard the first data, and the first data is downlink data of the UE; and a second processing unit, configured to process the first data according to the first indication received by the second receiving unit.

In a first possible implementation manner of the fourth aspect, the first indication received by the second receiving unit includes a first paging delaying instruction, and is used for instructing the second processing unit to determine a first time according to the first paging delaying instruction and retain the first data within the first time, or is used for instructing the second processing unit to discard the first data according to the first paging delaying instruction;

or, the first indication received by the second receiving unit includes a first suggested waiting time, and is used for instructing the second processing unit to retain the first data within the first suggested waiting time;

or, the first indication received by the second receiving unit includes the first paging delaying instruction and the first suggested waiting time, and is used for instructing the second processing unit to retain the first data within the first suggested waiting time after the second processing unit determines, according to the first paging delaying instruction, that the MME needs to delay paging the UE;

or, the first indication received by the second receiving unit includes the first paging delaying instruction and an EPS bearer identifier, and is used for instructing the second processing unit to determine the first time according to the first paging delaying instruction and retain, within the first time, the first data corresponding to the EPS bearer identifier, or is used for instructing the second processing unit to discard, according to the first paging delaying instruction, the first data corresponding to the EPS bearer identifier;

or, the first indication received by the second receiving unit includes the first suggested waiting time and the EPS bearer identifier, and is used for instructing the second processing unit to retain, within the first suggested waiting time, the first data corresponding to the EPS bearer identifier;

or, the first indication received by the second receiving unit includes the first paging delaying instruction, the first suggested waiting time, and the EPS bearer identifier, and is used for instructing the second processing unit to retain, within the first suggested waiting time, the first data corresponding to the EPS bearer identifier after the second processing unit determines, according to the first paging delaying instruction, that the MME needs to delay paging the UE.

With reference to the fourth aspect or the first possible implementation manner of the fourth aspect, in a second possible implementation manner, the second receiving unit is further configured to receive a second indication from the MME, where the second indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the second indication is used for instructing the SGW to normally transmit and receive the first data; and the second processing unit is further configured to process the first data according to the second indication received by the second receiving unit.

According to a fifth aspect, an embodiment of the present invention further provides an MME, including:

a first processor, configured to acquire information of a UE; determine, according to the information of the UE, whether the UE satisfies a first preset condition; and if the UE satisfies the first preset condition, generate a first indication, where the first indication is used for instructing an SGW to retain first data or discard the first data, and the first data is downlink data of the UE;

a first memory, configured to store the information of the UE acquired by the first processor and the first indication generated by the first processor; and a first transmitter, configured to send the first indication stored in the first memory and generated by the first processor to the SOW, so that the SGW processes the first data according to the first indication.

In a first possible implementation manner of the fifth aspect, the information of the UE acquired by the first processor includes a type of the UE; the first preset condition is that the UE is a power-saving UE; and the first processor is configured to determine, according to the type of the UE, whether the UE is the power-saving UE.

In a second possible implementation manner of the fifth aspect, the information of the UE acquired by the first processor includes a DRX period of the UE; the first preset condition is that the DRX period of the UE is greater than a first preset threshold; and the first processor is configured to determine, according to the DRX period of the UE, whether the DRX period of the UE is greater than the first preset threshold.

With reference to the fifth aspect, or either of the first possible implementation manner and the second possible implementation manner of the fifth aspect, in a third possible implementation manner, the first indication generated by the first processor includes a first paging delaying instruction, and is used for instructing the SGW to determine a first time according to the first paging delaying instruction and retain the first data within the first time, or is used for instructing the SGW to discard the first data according to the first paging delaying instruction;

or, the first indication generated by the first processor includes a first suggested waiting time, and is used for instructing the SGW to retain the first data within the first suggested waiting time;

or, the first indication generated by the first processor includes the first paging delaying instruction and the first suggested waiting time, and is used for instructing the SGW to retain the first data within the first suggested waiting time after the SGW determines, according to the first paging delaying instruction, that the MME needs to delay paging the UE;

or, the first indication generated by the first processor includes the first paging delaying instruction and an EPS bearer identifier, and is used for instructing the SGW to determine the first time according to the first paging delaying instruction and retain, within the first time, the first data corresponding to the EPS bearer identifier, or is used for instructing the SGW to discard, according to the first paging delaying instruction, the first data corresponding to the EPS bearer identifier;

or, the first indication generated by the first processor includes the first suggested waiting time and the EPS bearer identifier, and is used for instructing the SGW to retain, within the first suggested waiting time, the first data corresponding to the EPS bearer identifier;

or, the first indication generated by the first processor includes the first paging delaying instruction, the first suggested waiting time, and the EPS bearer identifier, and is used for instructing the SGW to retain, within the first suggested waiting time, the first data corresponding to the EPS bearer identifier after the SGW determines, according to the first paging delaying instruction, that the MME needs to delay paging the UE.

With reference to the fifth aspect, or any one of the first possible implementation manner to the third possible implementation manner of the fifth aspect, in a fourth possible implementation manner, the MME further includes:

a first receiver, configured to receive subscription data of the UE from an HSS; where the first processor is configured to acquire the information of the UE according to the subscription data of the UE received by the first receiver;

or, the first receiver is configured to receive a NAS message/an AS message from the UE, and the first processor is configured to acquire the information of the UE according to the NAS message/AS message of the UE received by the first receiver;

or, the first processor is configured to acquire the information of the UE according to a pre-configured QoS parameter of a bearer used by the UE.

With reference to the fourth possible implementation manner of the fifth aspect, in a fifth possible implementation manner, the first processor is further configured to: if the subscription data of the UE, the QoS parameter of the bearer used by the UE, or a state of the UE changes, generate a second indication according to subscription data of the UE, a QoS parameter of the bearer used by the UE, or a state of the UE that is obtained after the change, and store the second indication into the first memory, where the second indication is used for instructing the SGW to normally transmit and receive the first data;

the first memory is configured to store the second indication generated by the first processor; and the first transmitter is further configured to send the second indication stored in the first memory and generated by the first processor to the SGW, so that the SGW processes the first data according to the second indication.

According to a sixth aspect, an embodiment of the present invention further provides an SGW, including:

a second receiver, configured to receive a first indication from an MME, where the first indication is generated by the MME when the MME acquires information of a UE and determines, according to the information of the UE, that the UE satisfies a first preset condition, the first indication is used for instructing the SGW to retain first data or discard the first data, and the first data is downlink data of the UE;

a second processor, configured to store the first indication received by the second receiver into a second memory, and process the first data according to the first indication; and the second memory, configured to store the first indication.

In a first possible implementation manner of the sixth aspect, the first indication received by the second receiver includes a first paging delaying instruction, and is used for instructing the second processor to determine a first time according to the first paging delaying instruction and retain the first data within the first time, or is used for instructing the second processor to discard the first data according to the first paging delaying instruction;

or, the first indication received by the second receiver includes a first suggested waiting time, and is used for instructing the second processor to retain the first data within the first suggested waiting time;

or, the first indication received by the second receiver includes the first paging delaying instruction and the first suggested waiting time, and is used for instructing the second processor to retain the first data within the first suggested waiting time after the second processor determines, according to the first paging delaying instruction, that the MME needs to delay paging the UE;

or, the first indication received by the second receiver includes the first paging delaying instruction and an EPS bearer identifier, and is used for instructing the second processor to determine the first time according to the first paging delaying instruction and retain, within the first time, the first data corresponding to the EPS bearer identifier, or is used for instructing the second processor to discard, according to the first paging delaying instruction, the first data corresponding to the EPS bearer identifier;

or, the first indication received by the second receiver includes the first suggested waiting time and the EPS bearer identifier, and is used for instructing the second processor to retain, within the first suggested waiting time, the first data corresponding to the EPS bearer identifier;

or, the first indication received by the second receiver includes the first paging delaying instruction, the first suggested waiting time, and the EPS bearer identifier, and is used for instructing the second processor to retain, within the first suggested waiting time, the first data corresponding to the EPS bearer identifier after the second processor determines, according to the first paging delaying instruction, that the MME needs to delay paging the UE.

With reference to the sixth aspect or the first possible implementation manner of the sixth aspect, in a second possible implementation manner, the second receiver is further configured to receive a second indication from the MME, where the second indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the second indication is used for instructing the SGW to normally transmit and receive the first data;

the second processor is further configured to store the second indication received by the second receiver into the second memory, and process the first data according to the second indication; and the second memory is further configured to store the second indication.

According to the communications method and apparatus provided in the embodiments of the present invention, an MME acquires information of a UE; the MME determines, according to the information of the UE, whether the UE satisfies a first preset condition; if the UE satisfies the first preset condition, the MME generates a first indication, where the first indication is used for instructing an SGW to retain first data or discard first data, and the first data is downlink data of the UE; and the MME sends the first indication to the SOW, so that the SGW processes the first data according to the first indication. By using this solution, if the UE satisfies the first preset condition, the MME sends a corresponding first indication to the SGW, so that when receiving the downlink data of the UE from a network, the SGW can buffer the downlink data of the UE for a long time according to the first indication. In this way, the SGW may not consider that buffering the downlink data of the UE for a long time is caused by the fact that an error or exception occurs, thereby solving the problem in the prior art that, in order to save power, when the MME delays delivering a paging message or the UE uses a long DRX period, an exception may occur in the SGW.

According to a seventh aspect, an embodiment of the present invention provides another communications method, including:

acquiring, by an MME, information of a UE;

determining, by the MME according to the information of the UE, whether the UE satisfies a first preset condition;

if the UE satisfies the first preset condition, generating, by the MME, a third indication, where the third indication is used for instructing a packet data network gateway PGW to retain first data, and the first data is downlink data of the UE; and sending, by the MME, the third indication to an SGW, so that the SGW sends the third indication to the PGW, and further, the PGW processes the first data according to the third indication.

In a first possible implementation manner of the seventh aspect, the information of the UE includes a type of the UE; the first preset condition is that the UE is a power-saving UE; and the determining, by the MME according to the information of the UE, whether the UE satisfies a first preset condition includes:

determining, by the MME according to the type of the UE, whether the UE is the power-saving UE.

In a second possible implementation manner of the seventh aspect, the information of the UE includes a DRX period of the UE; the first preset condition is that the DRX period of the UE is greater than a first preset threshold; and the determining, by the MME according to the information of the UE, whether the UE satisfies a first preset condition includes:

determining, by the MME according to the DRX period of the UE, whether the DRX period of the UE is greater than the first preset threshold.

With reference to the seventh aspect, or either of the first possible implementation manner and the second possible implementation manner of the seventh aspect, in a third possible implementation manner, the third indication includes a third paging delaying instruction, and is used for instructing the PGW to determine a first time according to the third paging delaying instruction, retain the first data within the first time, and send the first data to the SGW after the first time;

or, the third indication includes a third suggested waiting time, and is used for instructing the PGW to retain the first data within the third suggested waiting time, and send the first data to the SGW after the third suggested waiting time;

or, the third indication includes the third paging delaying instruction and the third suggested waiting time, and is used for instructing the PGW to retain the first data within the third suggested waiting time after the PGW determines, according to the third paging delaying instruction, that the MME needs to delay paging the UE, and send the first data to the SGW after the third suggested waiting time;

or, the third indication includes the third paging delaying instruction and an EPS bearer identifier, and is used for instructing the PGW to determine the first time according to the third paging delaying instruction, retain, within the first time, the first data corresponding to the EPS bearer identifier, and send the first data corresponding to the EPS bearer identifier to the SGW after the first time;

or, the third indication includes the third suggested waiting time and the EPS bearer identifier, and is used for instructing the PGW to retain, within the third suggested waiting time, the first data corresponding to the EPS bearer identifier, and send the first data corresponding to the EPS bearer identifier to the SGW after the third suggested waiting time;

or, the third indication includes the third paging delaying instruction, the third suggested waiting time, and the EPS bearer identifier, and is used for instructing the PGW to retain, within the third suggested waiting time, the first data corresponding to the EPS bearer identifier after the PGW determines, according to the third paging delaying instruction, that the MME needs to delay paging the UE, and send the first data corresponding to the EPS bearer identifier to the SGW after the third suggested waiting time.

With reference to the seventh aspect, or any one of the first possible implementation manner to the third possible implementation manner of the seventh aspect, in a fourth possible implementation manner, the method of acquiring, by an MME, information of a UE includes:

receiving, by the MME, subscription data of the UE from an HSS, and acquiring the information of the UE according to the subscription data of the UE;

or, receiving, by the MME, a NAS message/an AS message from the UE, and acquiring the information of the UE according to the NAS message/AS message of the UE;

or, acquiring, by the MME, the information of the UE according to a pre-configured QoS parameter of a bearer used by the UE.

With reference to the fourth possible implementation manner of the seventh aspect, in a fifth possible implementation manner, the method further includes:

if the subscription data of the UE, the QoS parameter of the bearer used by the UE, or a state of the UE changes, generating, by the MME, a fourth indication according to subscription data of the UE, a QoS parameter of the bearer used by the UE, or a state of the UE that is obtained after the change, where the fourth indication is used for instructing the PGW to normally transmit and receive the first data; and sending, by the MME, the fourth indication to the SGW, so that the SGW sends the fourth indication to the PGW, and further, the PGW processes the first data according to the fourth indication.

According to an eighth aspect, an embodiment of the present invention further provides another communications method, including:

receiving, by an SGW, a third indication from an MME, where the third indication is generated by the MME when the MME acquires information of a UE and determines, according to the information of the UE, that the UE satisfies a first preset condition, the third indication is used for instructing a PGW to retain first data, and the first data is downlink data of the UE; and sending, by the SGW, the third indication to the PGW, so that the PGW processes the first data according to the third indication.

In a first possible implementation manner of the eighth aspect, the third indication includes a third paging delaying instruction, and is used for instructing the PGW to determine a first time according to the third paging delaying instruction, retain the first data within the first time, and send the first data to the SGW after the first time;

or, the third indication includes a third suggested waiting time, and is used for instructing the PGW to retain the first data within the third suggested waiting time, and send the first data to the SGW after the third suggested waiting time;

or, the third indication includes the third paging delaying instruction and the third suggested waiting time, and is used for instructing the PGW to retain the first data within the third suggested waiting time after the PGW determines, according to the third paging delaying instruction, that the MME needs to delay paging the UE, and send the first data to the SGW after the third suggested waiting time;

or, the third indication includes the third paging delaying instruction and an EPS bearer identifier, and is used for instructing the PGW to determine the first time according to the third paging delaying instruction, retain, within the first time, the first data corresponding to the EPS bearer identifier, and send the first data corresponding to the EPS bearer identifier to the SGW after the first time;

or, the third indication includes the third suggested waiting time and the EPS bearer identifier, and is used for instructing the PGW to retain, within the third suggested waiting time, the first data corresponding to the EPS bearer identifier, and send the first data corresponding to the EPS bearer identifier to the SGW after the third suggested waiting time;

or, the third indication includes the third paging delaying instruction, the third suggested waiting time, and the EPS bearer identifier, and is used for instructing the PGW to retain, within the third suggested waiting time, the first data corresponding to the EPS bearer identifier after the PGW determines, according to the third paging delaying instruction, that the MME needs to delay paging the UE, and send the first data corresponding to the EPS bearer identifier to the SGW after the third suggested waiting time.

With reference to the eighth aspect or the first possible implementation manner of the eighth aspect, in a second possible implementation manner, the method further includes:

receiving, by the SGW, a fourth indication from the MME, where the fourth indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the fourth indication is used for instructing the PGW to normally transmit and receive the first data; and sending, by the SGW, the fourth indication to the PGW, so that the PGW processes the first data according to the fourth indication.

According to a ninth aspect, an embodiment of the present invention further provides another communications method, including:

receiving, by a PGW, a third indication from an SGW, where the third indication is generated by an MME when the MME acquires information of a UE and determines, according to the information of the UE, that the UE satisfies a first preset condition, and the third indication is sent by the MME to the SGW, the third indication is used for instructing the PGW to retain first data, and the first data is downlink data of the UE; and processing, by the PGW, the first data according to the third indication.

In a first possible implementation manner of the ninth aspect, the third indication includes a third paging delaying instruction, and is used for instructing the PGW to determine a first time according to the third paging delaying instruction, retain the first data within the first time, and send the first data to the SGW after the first time;

or, the third indication includes a third suggested waiting time, and is used for instructing the PGW to retain the first data within the third suggested waiting time, and send the first data to the SGW after the third suggested waiting time;

or, the third indication includes the third paging delaying instruction and the third suggested waiting time, and is used for instructing the PGW to retain the first data within the third suggested waiting time after the PGW determines, according to the third paging delaying instruction, that the MME needs to delay paging the UE, and send the first data to the SGW after the third suggested waiting time;

or, the third indication includes the third paging delaying instruction and an EPS bearer identifier, and is used for instructing the PGW to determine the first time according to the third paging delaying instruction, retain, within the first time, the first data corresponding to the EPS bearer identifier, and send the first data corresponding to the EPS bearer identifier to the SGW after the first time;

or, the third indication includes the third suggested waiting time and the EPS bearer identifier, and is used for instructing the PGW to retain, within the third suggested waiting time, the first data corresponding to the EPS bearer identifier, and send the first data corresponding to the EPS bearer identifier to the SGW after the third suggested waiting time;

or, the third indication includes the third paging delaying instruction, the third suggested waiting time, and the EPS bearer identifier, and is used for instructing the PGW to retain, within the third suggested waiting time, the first data corresponding to the EPS bearer identifier after the PGW determines, according to the third paging delaying instruction, that the MME needs to delay paging the UE, and send the first data corresponding to the EPS bearer identifier to the SGW after the third suggested waiting time.

With reference to the ninth aspect or the first possible implementation manner of the ninth aspect, in a second possible implementation manner, the method further includes:

receiving, by the PGW, a fourth indication from the SGW, where the fourth indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the fourth indication is sent by the MME to the SGW, and the fourth indication is used for instructing the PGW to normally transmit and receive the first data; and processing, by the PGW, the first data according to the fourth indication.

According to a tenth aspect, an embodiment of the present invention provides an MME, including:

a first acquiring unit, configured to acquire information of a UE;

a first determining unit, configured to determine, according to the information of the UE acquired by the first acquiring unit, whether the UE satisfies a first preset condition;

a first generating unit, configured to: if the first determining unit determines that the UE satisfies the first preset condition, generate a third indication, where the third indication is used for instructing a PGW to retain first data, and the first data is downlink data of the UE; and a first sending unit, configured to send the third indication generated by the first generating unit to an SGW, so that the SGW sends the third indication to the PGW, and further, the PGW processes the first data according to the third indication.

In a first possible implementation manner of the tenth aspect, the information of the UE acquired by the first acquiring unit includes a type of the UE; the first preset condition is that the UE is a power-saving UE; and the first determining unit is configured to determine, according to the type of the UE, whether the UE is the power-saving UE.

In a second possible implementation manner of the tenth aspect, the information of the UE acquired by the first acquiring unit includes a DRX period of the UE; the first preset condition is that the DRX period of the UE is greater than a first preset threshold; and the first determining unit is configured to determine, according to the DRX period of the UE, whether the DRX period of the UE is greater than the first preset threshold.

With reference to the tenth aspect, or either of the first possible implementation manner and the second possible implementation manner of the tenth aspect, in a third possible implementation manner, the third indication generated by the first generating unit includes a third paging delaying instruction, and is used for instructing the PGW to determine a first time according to the third paging delaying instruction, retain the first data within the first time, and send the first data to the SGW after the first time;

or, the third indication generated by the first generating unit includes a third suggested waiting time, and is used for instructing the PGW to retain the first data within the third suggested waiting time, and send the first data to the SGW after the third suggested waiting time;

or, the third indication generated by the first generating unit includes the third paging delaying instruction and the third suggested waiting time, and is used for instructing the PGW to retain the first data within the third suggested waiting time after the PGW determines, according to the third paging delaying instruction, that the MME needs to delay paging the UE, and send the first data to the SGW after the third suggested waiting time;

or, the third indication generated by the first generating unit includes the third paging delaying instruction and an EPS bearer identifier, and is used for instructing the PGW to determine the first time according to the third paging delaying instruction, retain, within the first time, the first data corresponding to the EPS bearer identifier, and send the first data corresponding to the EPS bearer identifier to the SGW after the first time;

or, the third indication generated by the first generating unit includes the third suggested waiting time and the EPS bearer identifier, and is used for instructing the PGW to retain, within the third suggested waiting time, the first data corresponding to the EPS bearer identifier, and send the first data corresponding to the EPS bearer identifier to the SGW after the third suggested waiting time;

or, the third indication generated by the first generating unit includes the third paging delaying instruction, the third suggested waiting time, and the EPS bearer identifier, and is used for instructing the PGW to retain, within the third suggested waiting time, the first data corresponding to the EPS bearer identifier after the PGW determines, according to the third paging delaying instruction, that the MME needs to delay paging the UE, and send the first data corresponding to the EPS bearer identifier to the SGW after the third suggested waiting time.

With reference to the tenth aspect, or any one of the first possible implementation manner to the third possible implementation manner of the tenth aspect, in a fourth possible implementation manner, the MME further includes:

a first receiving unit, configured to receive subscription data of the UE from an HSS; where the first acquiring unit is configured to acquire the information of the UE according to the subscription data of the UE received by the first receiving unit;

or, the first receiving unit is configured to receive a NAS message/an AS message from the UE, and the first acquiring unit is configured to acquire the information of the UE according to the NAS message/AS message of the UE received by the first receiving unit;

or, the first acquiring unit is configured to acquire the information of the UE according to a pre-configured QoS parameter of a bearer used by the UE.

With reference to the fourth possible implementation manner of the tenth aspect, in a fifth possible implementation manner, the first generating unit is further configured to: if the subscription data of the UE, the QoS parameter of the bearer used by the UE, or a state of the UE changes, generate a fourth indication according to subscription data of the UE, a QoS parameter of the bearer used by the UE, or a state of the UE that is obtained after the change, where the fourth indication is used for instructing the PGW to normally transmit and receive the first data; and the first sending unit is further configured to send the fourth indication generated by the first generating unit to the SGW, so that the SGW sends the fourth indication to the PGW, and further, the PGW processes the first data according to the fourth indication.

According to an eleventh aspect, an embodiment of the present invention provides an SGW, including:

a second receiving unit, configured to receive a third indication from an MME, where the third indication is generated by the MME when the MME acquires information of a UE and determines, according to the information of the UE, that the UE satisfies a first preset condition, the third indication is used for instructing a PGW to retain first data, and the first data is downlink data of the UE; and a second sending unit, configured to send the third indication received by the second receiving unit to the PGW, so that the PGW processes the first data according to the third indication.

In a first possible implementation manner of the eleventh aspect, the third indication received by the second receiving unit includes a third paging delaying instruction, and is used for instructing the PGW to determine a first time according to the third paging delaying instruction, retain the first data within the first time, and send the first data to the SGW after the first time;

or, the third indication received by the second receiving unit includes a third suggested waiting time, and is used for instructing the PGW to retain the first data within the third suggested waiting time, and send the first data to the SGW after the third suggested waiting time;

or, the third indication received by the second receiving unit includes the third paging delaying instruction and the third suggested waiting time, and is used for instructing the PGW to retain the first data within the third suggested waiting time after the PGW determines, according to the third paging delaying instruction, that the MME needs to delay paging the UE, and send the first data to the SGW after the third suggested waiting time;

or, the third indication received by the second receiving unit includes the third paging delaying instruction and an EPS bearer identifier, and is used for instructing the PGW to determine the first time according to the third paging delaying instruction, retain, within the first time, the first data corresponding to the EPS bearer identifier, and send the first data corresponding to the EPS bearer identifier to the SGW after the first time;

or, the third indication received by the second receiving unit includes the third suggested waiting time and the EPS bearer identifier, and is used for instructing the PGW to retain, within the third suggested waiting time, the first data corresponding to the EPS bearer identifier, and send the first data corresponding to the EPS bearer identifier to the SGW after the third suggested waiting time;

or, the third indication received by the second receiving unit includes the third paging delaying instruction, the third suggested waiting time, and the EPS bearer identifier, and is used for instructing the PGW to retain, within the third suggested waiting time, the first data corresponding to the EPS bearer identifier after the PGW determines, according to the third paging delaying instruction, that the MME needs to delay paging the UE, and send the first data corresponding to the EPS bearer identifier to the SGW after the third suggested waiting time.

With reference to the eleventh aspect or the first possible implementation manner of the eleventh aspect, in a second possible implementation manner, the second receiving unit is further configured to receive a fourth indication from the MME, where the fourth indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the fourth indication is used for instructing the PGW to normally transmit and receive the first data; and the second sending unit is further configured to send the fourth indication received by the second receiving unit to the PGW, so that the PGW processes the first data according to the fourth indication.

According to a twelfth aspect, an embodiment of the present invention provides a PGW, including:

a third receiving unit, configured to receive a third indication from an SGW, where the third indication is generated by an MME when the MME acquires information of a UE and determines, according to the information of the UE, that the UE satisfies a first preset condition, and the third indication is sent by the MME to the SGW, the third indication is used for instructing the PGW to retain first data, and the first data is downlink data of the UE; and a third processing unit, configured to process the first data according to the third indication received by the third receiving unit.

In a first possible implementation manner of the twelfth aspect, the third indication received by the third receiving unit includes a third paging delaying instruction, and is used for instructing the third processing unit to determine a first time according to the third paging delaying instruction and retain the first data within the first time, and is used for instructing a third sending unit to send the first data to the SGW after the first time;

or, the third indication received by the third receiving unit includes a third suggested waiting time, and is used for instructing the third processing unit to retain the first data within the third suggested waiting time, and is used for instructing the third sending unit to send the first data to the SGW after the third suggested waiting time;

or, the third indication received by the third receiving unit includes the third paging delaying instruction and the third suggested waiting time, and is used for instructing the third processing unit to retain the first data within the third suggested waiting time after the third processing unit determines, according to the third paging delaying instruction, that the MME needs to delay paging the UE, and is used for instructing the third sending unit to send the first data to the SGW after the third suggested waiting time;

or, the third indication received by the third receiving unit includes the third paging delaying instruction and an EPS bearer identifier, and is used for instructing the third processing unit to determine the first time according to the third paging delaying instruction and retain, within the first time, the first data corresponding to the EPS bearer identifier, and is used for instructing the third sending unit to send the first data corresponding to the EPS bearer identifier to the SGW after the first time;

or, the third indication received by the third receiving unit includes the third suggested waiting time and the EPS bearer identifier, and is used for instructing the third processing unit to retain, within the third suggested waiting time, the first data corresponding to the EPS bearer identifier, and is used for instructing the third sending unit to send the first data corresponding to the EPS bearer identifier to the SGW after the third suggested waiting time;

or, the third indication received by the third receiving unit includes the third paging delaying instruction, the third suggested waiting time, and the EPS bearer identifier, and is used for instructing the third processing unit to retain, within the third suggested waiting time, the first data corresponding to the EPS bearer identifier after the third processing unit determines, according to the third paging delaying instruction, that the MME needs to delay paging the UE, and is used for instructing the third sending unit to send the first data corresponding to the EPS bearer identifier to the SGW after the third suggested waiting time.

With reference to the twelfth aspect or the first possible implementation manner of the twelfth aspect, in a second possible implementation manner, the third receiving unit is further configured to receive a fourth indication from the SGW, where the fourth indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the fourth indication is sent by the MME to the SGW, and the fourth indication is used for instructing the PGW to normally transmit and receive the first data; and the third processing unit is further configured to process the first data according to the fourth indication received by the third receiving unit.

According to a thirteenth aspect, an embodiment of the present invention further provides an MME, including:

a first processor, configured to acquire information of a UE; determine, according to the information of the UE, whether the UE satisfies a first preset condition; and if the UE satisfies the first preset condition, generate a third indication, where the third indication is used for instructing a PGW to retain first data, and the first data is downlink data of the UE;

a first transmitter, configured to send the third indication generated by the first processor to an SGW, so that the SGW sends the third indication to the PGW, and further, the PGW processes the first data according to the third indication; and a first memory, configured to store the information of the UE acquired by the first processor and the third indication generated by the first processor.

In a first possible implementation manner of the thirteenth aspect, the information of the UE acquired by the first processor includes a type of the UE; the first preset condition is that the UE is a power-saving UE; and the first processor is configured to determine, according to the type of the UE, whether the UE is the power-saving UE.

In a second possible implementation manner of the thirteenth aspect, the information of the UE acquired by the first processor includes a DRX period of the UE; the first preset condition is that the DRX period of the UE is greater than a first preset threshold; and the first processor is configured to determine, according to the DRX period of the UE, whether the DRX period of the UE is greater than the first preset threshold.

With reference to the thirteenth aspect, or either of the first possible implementation manner and the second possible implementation manner of the thirteenth aspect, in a third possible implementation manner, the third indication generated by the first processor includes a third paging delaying instruction, and is used for instructing the PGW to determine a first time according to the third paging delaying instruction, retain the first data within the first time, and send the first data to the SGW after the first time;

or, the third indication generated by the first processor includes a third suggested waiting time, and is used for instructing the PGW to retain the first data within the third suggested waiting time, and send the first data to the SGW after the third suggested waiting time;

or, the third indication generated by the first processor includes the third paging delaying instruction and the third suggested waiting time, and is used for instructing the PGW to retain the first data within the third suggested waiting time after the PGW determines, according to the third paging delaying instruction, that the MME needs to delay paging the UE, and send the first data to the SGW after the third suggested waiting time;

or, the third indication generated by the first processor includes the third paging delaying instruction and an EPS bearer identifier, and is used for instructing the PGW to determine the first time according to the third paging delaying instruction, retain, within the first time, the first data corresponding to the EPS bearer identifier, and send the first data corresponding to the EPS bearer identifier to the SGW after the first time;

or, the third indication generated by the first processor includes the third suggested waiting time and the EPS bearer identifier, and is used for instructing the PGW to retain, within the third suggested waiting time, the first data corresponding to the EPS bearer identifier, and send the first data corresponding to the EPS bearer identifier to the SGW after the third suggested waiting time;

or, the third indication generated by the first processor includes the third paging delaying instruction, the third suggested waiting time, and the EPS bearer identifier, and is used for instructing the PGW to retain, within the third suggested waiting time, the first data corresponding to the EPS bearer identifier after the PGW determines, according to the third paging delaying instruction, that the MME needs to delay paging the UE, and send the first data corresponding to the EPS bearer identifier to the SGW after the third suggested waiting time.

With reference to the thirteenth aspect, or any one of the first possible implementation manner to the third possible implementation manner of the thirteenth aspect, in a fourth possible implementation manner, the MME further includes:

a first receiver, configured to receive subscription data of the UE from an HSS; where the first processor is configured to acquire the information of the UE according to the subscription data of the UE received by the first receiver;

or, the first receiver is configured to receive a NAS message/ an AS message from the UE, and the first processor is configured to acquire the information of the UE according to the NAS message/AS message of the UE received by the first receiver;

or, the first processor is configured to acquire the information of the UE according to a pre-configured QoS parameter of a bearer used by the UE.

With reference to the fourth possible implementation manner of the thirteenth aspect, in a fifth possible implementation manner, the first processor is further configured to: if the subscription data of the UE, the QoS parameter of the bearer used by the UE, or a state of the UE changes, generate a fourth indication according to subscription data of the UE, a QoS parameter of the bearer used by the UE, or a state of the UE that is obtained after the change, where the fourth indication is used for instructing the PGW to normally transmit and receive the first data;

the first transmitter is further configured to send the fourth indication generated by the first processor to the SGW, so that the SGW sends the fourth indication to the PGW, and further, the PGW processes the first data according to the fourth indication; and the first memory is further configured to store the fourth indication generated by the first processor.

According to a fourteenth aspect, an embodiment of the present invention further provides an SGW, including:

a second receiver, configured to receive a third indication from an MME, where the third indication is generated by the MME when the MME acquires information of a UE and determines, according to the information of the UE, that the UE satisfies a first preset condition, the third indication is used for instructing a PGW to retain first data, and the first data is downlink data of the UE;

a second processor, configured to store the third indication received by the second receiver into a second memory;

the second memory, configured to store the third indication; and a second transmitter, configured to send the third indication stored in the second memory and generated by the second processor to the PGW, so that the PGW processes the first data according to the third indication.

In a first possible implementation manner of the fourteenth aspect, the third indication received by the second receiver includes a third paging delaying instruction, and is used for instructing the PGW to determine a first time according to the third paging delaying instruction, retain the first data within the first time, and send the first data to the SGW after the first time;

or, the third indication received by the second receiver includes a third suggested waiting time, and is used for instructing the PGW to retain the first data within the third suggested waiting time, and send the first data to the SGW after the third suggested waiting time;

or, the third indication received by the second receiver includes the third paging delaying instruction and the third suggested waiting time, and is used for instructing the PGW to retain the first data within the third suggested waiting time after the PGW determines, according to the third paging delaying instruction, that the MME needs to delay paging the UE, and send the first data to the SGW after the third suggested waiting time;

or, the third indication received by the second receiver includes the third paging delaying instruction and an EPS bearer identifier, and is used for instructing the PGW to determine the first time according to the third paging delaying instruction, retain, within the first time, the first data corresponding to the EPS bearer identifier, and send the first data corresponding to the EPS bearer identifier to the SGW after the first time;

or, the third indication received by the second receiver includes the third suggested waiting time and the EPS bearer identifier, and is used for instructing the PGW to retain, within the third suggested waiting time, the first data corresponding to the EPS bearer identifier, and send the first data corresponding to the EPS bearer identifier to the SGW after the third suggested waiting time;

or, the third indication received by the second receiver includes the third paging delaying instruction, the third suggested waiting time, and the EPS bearer identifier, and is used for instructing the PGW to retain, within the third suggested waiting time, the first data corresponding to the EPS bearer identifier after the PGW determines, according to the third paging delaying instruction, that the MME needs to delay paging the UE, and send the first data corresponding to the EPS bearer identifier to the SGW after the third suggested waiting time.

With reference to the fourteenth aspect or the first possible implementation manner of the fourteenth aspect, in a second possible implementation manner, the second receiver is further configured to receive a fourth indication from the MME, where the fourth indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the fourth indication is used for instructing the PGW to normally transmit and receive the first data;

the second processor is further configured to store the fourth indication received by the second receiver into the second memory;

the second memory is further configured to store the fourth indication; and the second transmitter is further configured to send the fourth indication stored in the second memory and generated by the second processor to the PGW, so that the PGW processes the first data according to the fourth indication.

According to a fifteenth aspect, an embodiment of the present invention further provides a PGW, including:

a third receiver, configured to receive a third indication from an SGW, where the third indication is generated by an MME when the MME acquires information of a UE and determines, according to the information of the UE, that the UE satisfies a first preset condition, and the third indication is sent by the MME to the SOW, the third indication is used for instructing the PGW to retain first data, and the first data is downlink data of the UE;

a third processor, configured to store the third indication received by the third receiver into a third memory, and process the first data according to the third indication; and the third memory, configured to store the third indication.

In a first possible implementation manner of the fifteenth aspect, the third indication received by the third receiver includes a third paging delaying instruction, and is used for instructing the third processor to determine a first time according to the third paging delaying instruction and retain the first data within the first time, and is used for instructing the third transmitter to send the first data to the SGW after the first time;

or, the third indication received by the third receiver includes a third suggested waiting time, and is used for instructing the third processor to retain the first data within the third suggested waiting time, and is used for instructing the third transmitter to send the first data to the SGW after the third suggested waiting time;

or, the third indication received by the third receiver includes the third paging delaying instruction and the third suggested waiting time, and is used for instructing the third processor to retain the first data within the third suggested waiting time after the third processor determines, according to the third paging delaying instruction, that the MME needs to delay paging the UE, and is used for instructing the third transmitter to send the first data to the SGW after the third suggested waiting time;

or, the third indication received by the third receiver includes the third paging delaying instruction and an EPS bearer identifier, and is used for instructing the third processor to determine the first time according to the third paging delaying instruction and retain, within the first time, the first data corresponding to the EPS bearer identifier, and is used for instructing the third transmitter to send the first data corresponding to the EPS bearer identifier to the SGW after the first time;

or, the third indication received by the third receiver includes the third suggested waiting time and the EPS bearer identifier, and is used for instructing the third processor to retain, within the third suggested waiting time, the first data corresponding to the EPS bearer identifier, and is used for instructing the third transmitter to send the first data corresponding to the EPS bearer identifier to the SGW after the third suggested waiting time;

or, the third indication received by the third receiver includes the third paging delaying instruction, the third suggested waiting time, and the EPS bearer identifier, and is used for instructing the third processor to retain, within the third suggested waiting time, the first data corresponding to the EPS bearer identifier after the third processor determines, according to the third paging delaying instruction, that the MME needs to delay paging the UE, and is used for instructing the third transmitter to send the first data corresponding to the EPS bearer identifier to the SGW after the third suggested waiting time.

With reference to the fifteenth aspect or the first possible implementation manner of the fifteenth aspect, in a second possible implementation manner, the third receiver is further configured to receive a fourth indication from the SGW, where the fourth indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the fourth indication is sent by the MME to the SGW, and the fourth indication is used for instructing the PGW to normally transmit and receive the first data; and the third processor is further configured to store the fourth indication received by the third receiver into the third memory, and process the first data according to the fourth indication.

According to the another communications method and apparatus provided in the embodiments of the present invention, an MME acquires information of a UE; the MME determines, according to the information of the UE, whether the UE satisfies a first preset condition; if the UE satisfies the first preset condition, the MME generates a third indication, where the third indication is used for instructing a PGW to retain first data, and the first data is downlink data of the UE; and the MME sends the third indication to an SGW, so that the SGW sends the third indication to the PGW, and further, the PGW processes the first data according to the third indication. By using this solution, if the UE satisfies the first preset condition, the MME sends a corresponding third indication to the SGW, so that the SGW further sends the third indication to the PGW, and further, when receiving the downlink data of the UE from a network, the PGW can buffer the downlink data of the UE for a long time according to the third indication, and does not send the downlink data to the SGW immediately. In this way, an error or exception may not be caused by the fact that the SGW needs to buffer the downlink data of the UE for a long time, thereby solving the problem in the prior art that, in order to save power, when the MME delays delivering a paging message or the UE uses a long DRX period, an exception may occur in the SGW.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
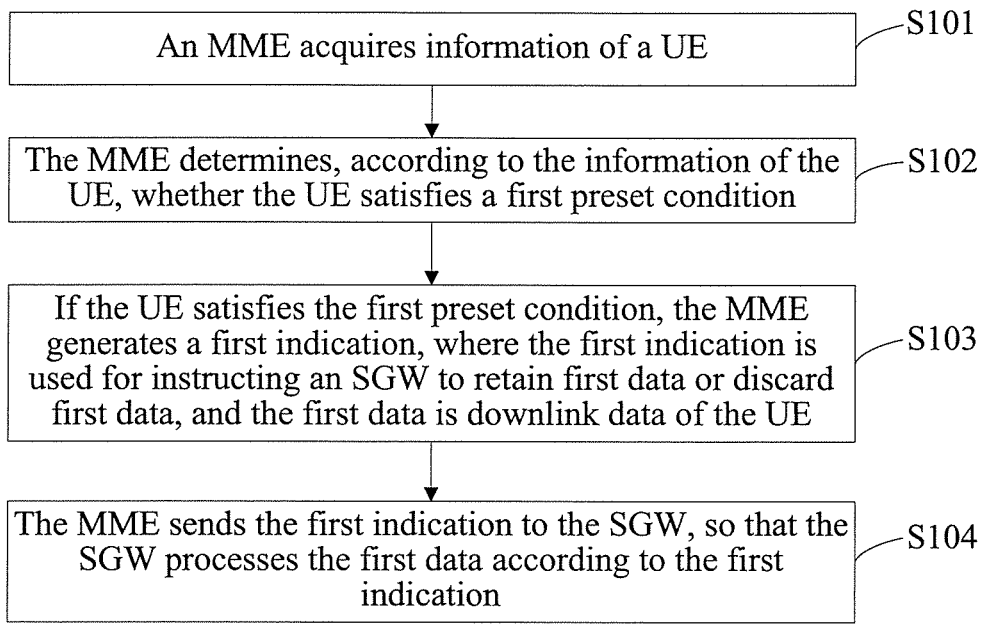
FIG. 1 is a first flowchart of a communications method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Various technologies described in this specification may be applied to various wireless communications systems, for example, current 2G and 3G communications systems and a next-generation communications system, a Global System for Mobile communications (GSM, Global System for Mobile Communications), a Code Division Multiple Access (CDMA, Code Division Multiple Access) system, a Time Division Multiple Access (TDMA, Time Division Multiple Access) system, a Wideband Code Division Multiple Access (WCDMA, Wideband Code Division Multiple Access) system, a Frequency Division Multiple Access (FDMA Frequency Division Multiple Access) system, an orthogonal frequency division multiple access (OFDMA, Orthogonal Frequency Division Multiple Access) system, a single carrier frequency division multiple address (SC-FDMA, Single Carrier Frequency Division Multiple Access) system, a general packet radio service (GPRS, General Packet Radio Service) system, an LTE system, and other communications systems.

A user equipment may be a wireless terminal or a wired terminal. The wireless terminal may refer to a device that provides a user with voice and/or data connectivity, a handheld device with a wireless connection function, or another processing device connected to a wireless modem. The wireless terminal may communicate with one or more core networks through a radio access network (such as RAN, Radio Access Network). The wireless terminal may be a mobile terminal, such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be called a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), or a user equipment.

Embodiment 1

This embodiment of the present invention provides a communications method, and relates to an MME side. As shown in FIG. 1, the method includes:

S101: An MME acquires information of a UE.

In the field of communications, an MME is a key control node of a 3GPP (The 3rd Generation Partnership Project, The 3rd Generation Partnership Project) LTE access network, and is responsible for a process of positioning and paging a UE in an idle mode, and includes relay function. The MME involves a bearer activation/deactivation process, and when a UE is initialized and connected to a network, may select an SGW for the UE. The MME authenticates a user by interacting with an HSS (Home Subscriber Server, home subscriber server), and allocates a temporary ID (Identity, serial number) to the user. Meanwhile, the MME supports interception and listening of data when permitted by law.

The UE in this embodiment of the present invention may be a mobile phone, an intelligent terminal, a multimedia device, a streaming media device, or the like.

The SGW is responsible for routing and forwarding a user data packet, and is also responsible for user-plane data exchange when the UE moves between eNodeBs (evolved NodeB, evolved base station) and between LTE and another 3GPP technology. For a UE in an idle state, the SGW is used as a node on a downlink data path, and when downlink data arrives, triggers paging of the UE.

The MME first needs to acquire the information of the UE, so as to perform corresponding determining on the UE according to the information, where the information of the UE may include a type of the UE or a DRX period of the UE, and for specific information of the UE and the determining performed on the UE according to the information, reference may be made to a description in a subsequent embodiment.

S102: The MME determines, according to the information of the UE, whether the UE satisfies a first preset condition.

After acquiring the information of the UE, the MME may determine, according to the information of the UE, whether the UE satisfies the first preset condition.

It should be noted that, the specific first preset condition is to be described in the subsequent embodiment.

S103: If the UE satisfies the first preset condition, the MME generates a first indication, where the first indication is used for instructing an SGW to retain first data or discard first data, and the first data is downlink data of the UE.

After the MME performs determining on the UE, if the UE satisfies the first present condition, the MME generates the corresponding first indication, where the first indication may be used for instructing the SGW to retain the first data or discard the first data, and the first data is the downlink data of the UE. The downlink data, which is provided in this embodiment of the present invention, of the UE may be data sent by another network device such as a gateway or a base station to the UE; on the contrary, uplink data of the UE is data sent by the UE to another network device such as a base station or a gateway.

Further, that the first indication is used for instructing the SGW to retain the first data or discard the first data may include that, the first indication is used for instructing the SGW to retain the first data, or the first indication is used for instructing the SGW to discard the first data.

Especially, after the MME performs determining on the UE, if the UE does not satisfy the first preset condition, the MME pages the UE and performs other operations according to the prior art.

S104: The MME sends the first indication to the SGW, so that the SGW processes the first data according to the first indication.

The MME sends the generated first indication to the SGW, so that when receiving the first data, that is, the downlink data of the UE, the SGW may retain the first data for the UE or discard the first data according to the first indication. Therefore, for a case in which the SGW does not send the downlink data of the UE within a time for which the SGW retains the first data for the UE, the SGW may not consider that the case is caused by the fact that an error or exception occurs.

Figure 2:
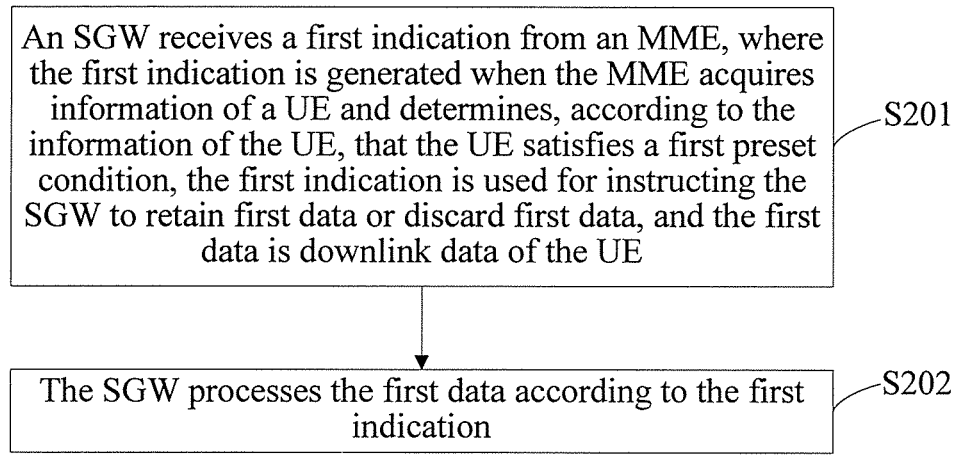
FIG. 2 is a second flowchart of a communications method according to an embodiment of the present invention.

This embodiment of the present invention further provides a communications method, and relates to an SGW side. As shown in FIG. 2, the method includes:

S201: An SGW receives first indication from an MME, where the first indication is generated by the MME when the MME acquires information of a UE and determines, according to the information of the UE, that the UE satisfies a first preset condition, the first indication is used for instructing the SGW to retain first data or discard first data, and the first data is downlink data of the UE.

The SGW receives the first indication from the MME. After the MME acquires the information of the UE, the MME determines, according to the information of the UE, whether the UE satisfies the first preset condition, and the first indication is generated by the MME when the UE satisfies the first preset condition, the first indication is used for instructing the SGW to retain the first data for the UE or discard the first data, and the first data is the downlink data of the UE.

S202: The SGW processes the first data according to the first indication.

After receiving the first indication from the MME, the SGW retains the first data for the UE or discard the first data according to the first indication.

In this embodiment of the present invention, the SGW may learn, according to the first indication received from the MME, that the UE may need to wait for a period of time before establishing a signaling and data channel with a network, to implement transmission of the first data; therefore, the SGW may buffer the first data, that is, the downlink data of the UE, for a period of time according to the first indication; and in this way, for a case in which the SGW does not send the downlink data of the UE within a time for which the SGW retains the first data for the UE, the SGW may not consider that the case is caused by the fact that an error or exception occurs.

According to the communications method provided in this embodiment of the present invention, an MME acquires information of a UE; the MME determines, according to the information of the UE, whether the UE satisfies a first preset condition; if the UE satisfies the first preset condition, the MME generates a first indication, where the first indication is used for instructing an SGW to retain first data or discard first data, and the first data is downlink data of the UE; and the MME sends the first indication to the SGW, so that the SGW processes the first data according to the first indication. By using this solution, if the UE satisfies the first preset condition, the MME sends a corresponding first indication to the SGW, so that when receiving the downlink data of the UE from a network, the SGW can buffer the downlink data of the UE for a long time according to the first indication. In this way, the SGW may not consider that buffering the downlink data of the UE for a long time is caused by the fact that an error or exception occurs, thereby solving the problem in the prior art that, in order to save power, when the MME delays delivering a paging message or the UE uses a long DRX period, an exception may occur in the SGW.

Figure 3:
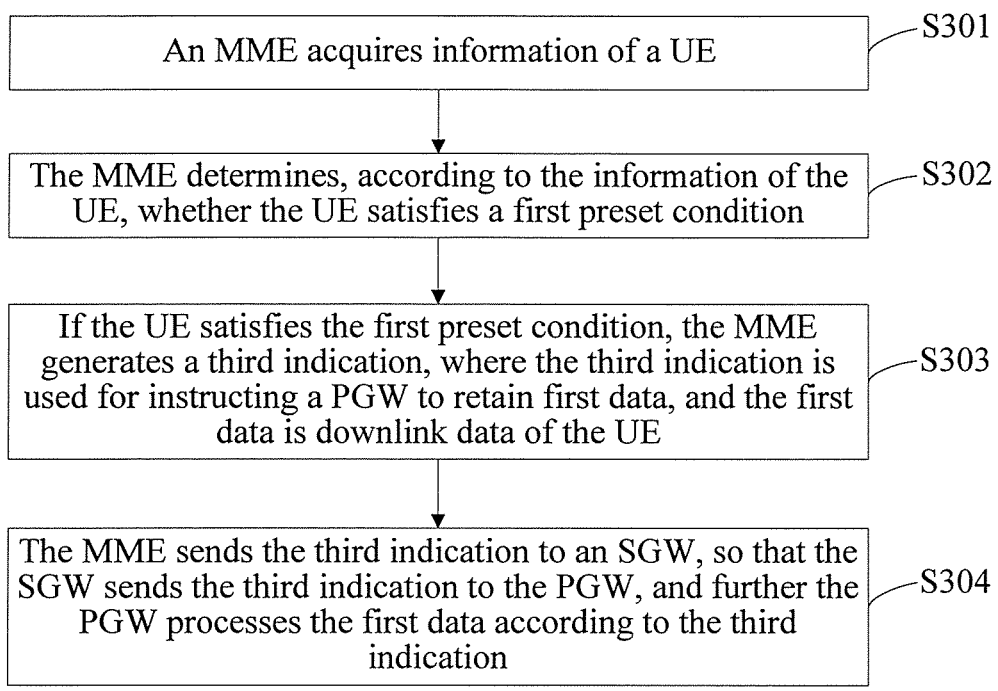
FIG. 3 is a first flowchart of another communications method according to an embodiment of the present invention.

This embodiment of the present invention provides another communications method, and relates to an MME side. As shown in FIG. 3, the method includes:

S301: An MME acquires information of a UE.

The MME acquires the information of the UE, so as to perform corresponding determining on the UE according to the information of the UE.

S302: The MME determines, according to the information of the UE, whether the UE satisfies a first preset condition.

After acquiring the information of the UE, the MME may determine, according to the information of the UE, whether the UE satisfies the first preset condition.

S303: If the UE satisfies the first preset condition, the MME generates a third indication, where the third indication is used for instructing a PGW to retain first data, and the first data is downlink data of the UE.

The PGW provides interface transmission at a connection point between the UE and an external packet data network. One UE may access multiple packet data networks by using multiple PGWs at the same time. The PGW implements an instruction to control data packet filtering, charging support, authorized interception, and data packet screening for each user. Another key function of the PGW is that the PGW is used as a core component of data exchange to bear data exchange between a 3GPP network and a non-3GPP network.

If the MME determines that the UE satisfies the first preset condition, the MME generates the third indication, where the third indication is used for instructing the PGW to retain the first data for the UE.

S304: The MME sends the third indication to an SGW, so that the SGW sends the third indication to the PGW, and further, the PGW processes the first data according to the third indication.

After generating the third indication, the MME sends the third indication to the SGW, so that the SGW further sends the third indication to the PGW, and the PGW can retain the first data for the UE according to the third indication; therefore, for a case in which the PGW does not send the downlink data of the UE to the SGW within a time for which the PGW retains the first data for the UE, the SGW may not consider that the case is caused by the fact that an error or exception occurs.

Figure 4:
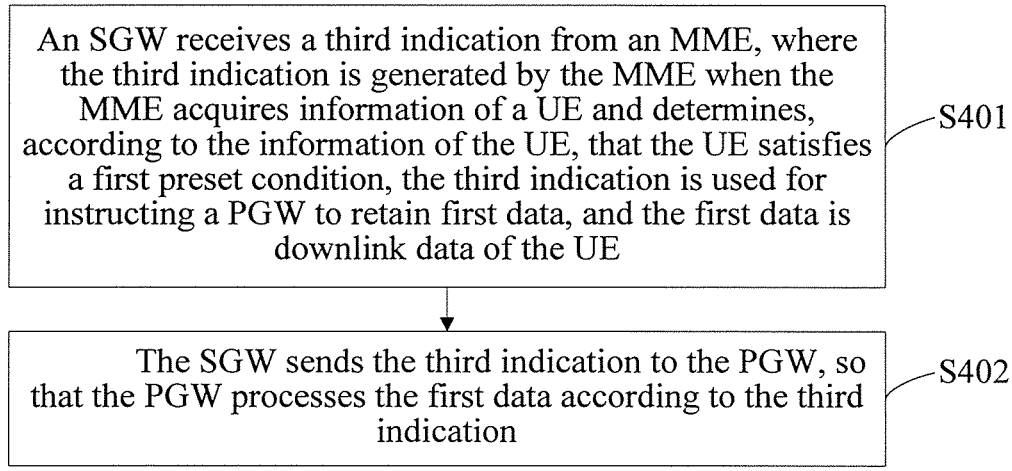
FIG. 4 is a second flowchart of another communications method according to an embodiment of the present invention.

This embodiment of the present invention further provides another communications method, and relates to an SGW side. As shown in FIG. 4, the method includes:

S401: An SGW receives a third indication from an MME, where the third indication is generated by the MME when the MME acquires information of a UE and determines, according to the information of the UE, that the UE satisfies a first preset condition, the third indication is used for instructing a PGW to retain first data, and the first data is downlink data of the UE.

The SGW receives the third indication from the MME. After acquiring the information of the UE, the MME determines, according to the information of the UE, whether the UE satisfies the first preset condition, and the third indication is generated by the MME when the UE satisfies the first preset condition, and the third indication is used for instructing the PGW to retain the first data for the UE.

S402: The SGW sends the third indication to the PGW, so that the PGW processes the first data according to the third indication.

After receiving the third indication from the MME, the SGW further forwards the third indication to the PGW, so that when receiving the first data, the PGW can retain the first data for the UE according to the third indication; therefore, for the case in which the PGW does not send the downlink data of the UE to the SGW within a time for which the PGW retains the first data for the UE, the SGW may not consider that the case is caused by the fact that an error or exception occurs.

Figure 5:
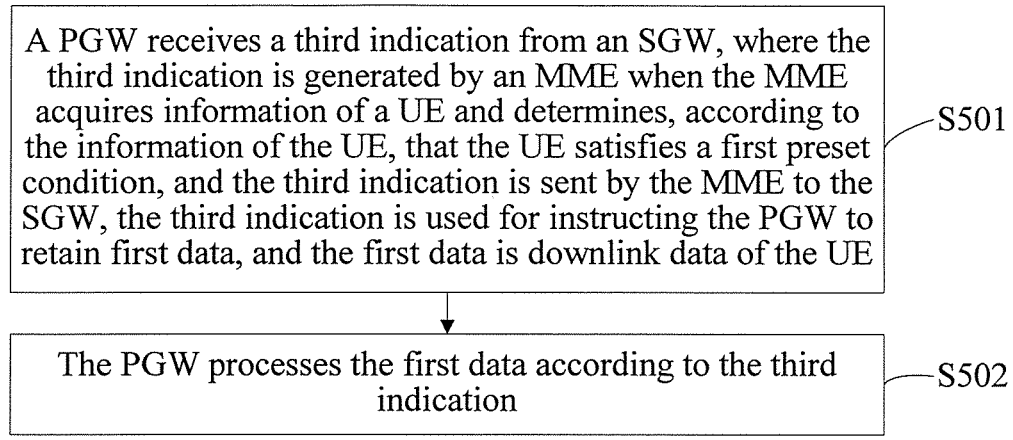
FIG. 5 is a third flowchart of another communications method according to an embodiment of the present invention.

This embodiment of the present invention further provides another communications method, and relates to a PGW side. As shown in FIG. 5, the method includes:

S501: A PGW receives a third indication from an SGW, where the third indication is generated by an MME when the MME acquires information of a UE and determines, according to the information of the UE, that the UE satisfies a first preset condition, and the third indication is sent by the MME to the SGW, the third indication is used for instructing the PGW to retain first data, and the first data is downlink data of the UE.

The PGW receives the third indication from the SGW. After acquiring the information of the UE, the MME determines, according to the information of the UE, whether the UE satisfies the first preset condition, and the third indication is generated by the MME when the UE satisfies the first preset condition, and the third indication is sent by the MME to the SGW, and the third indication may be used for instructing the PGW to retain the first data for the UE. This is a process of delivering the downlink data of the UE.

S502: The PGW processes the first data according to the third indication.

After receiving the third indication forwarded by the SGW, the PGW may retain the first data for the UE according to the third indication.

In this embodiment of the present invention, the PGW may learn, according to the third indication received from the SGW, that the UE may need to wait for a period of time before establishing a signaling and data channel to a network, to implement transmission of the first data; therefore, the PGW may buffer the first data, that is, the downlink data of the UE, for a period of time according to the third indication; and in this way, for a case in which the PGW does not send the downlink data of the UE to the SGW within a time for which the PGW retains the first data for the UE, the SGW may not consider that the case is caused by the fact that an error or exception occurs; or, the PGW may refuse, according to the third indication, to receive the downlink data of the UE delivered by a network, and in this way, the PGW may not deliver too much downlink data of the UE to the SGW, so as to avoid that a buffer capacity of the SGW is exceeded because the SGW retains too much downlink data of the UE.

According to the another communications method provided in this embodiment of the present invention, an MME acquires information of a UE; the MME determines, according to the information of the UE, whether the UE satisfies a first preset condition; if the UE satisfies the first preset condition, the MME generates a third indication, where the third indication is used for instructing a PGW to retain first data, and the first data is downlink data of the UE; and the MME sends the third indication to an SGW, so that the SGW sends the third indication to the PGW, and further, the PGW processes the first data according to the third indication. By using this solution, if the UE satisfies the first preset condition, the MME sends a corresponding third indication to the SGW, so that the SGW further sends the third indication to the PGW, and further, when receiving the downlink data of the UE from a network, the PGW can buffer the downlink data of the UE for a long time according to the third indication, and does not send the downlink data to the SGW immediately. In this way, an error or exception may not be caused by the fact that the SGW needs to buffer the downlink data of the UE for a long time, thereby solving the problem in the prior art that, in order to save power, when the MME delays delivering a paging message or the UE uses a long DRX period, an exception may occur in the SGW.

Embodiment 2

Figure 6:
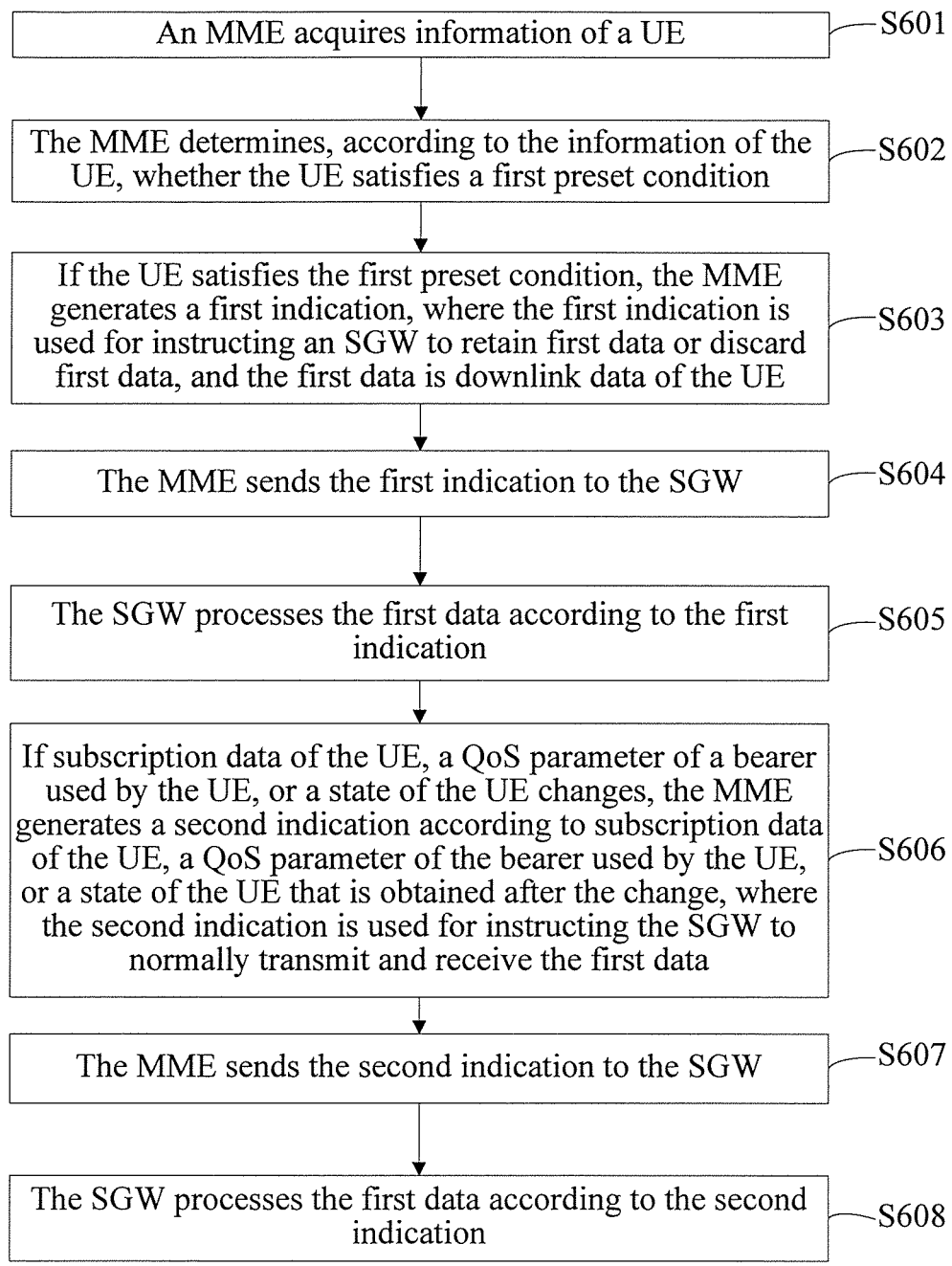
FIG. 6 is a third flowchart of a communications method according to an embodiment of the present invention.

This embodiment of the present invention provides a communications method. As shown in FIG. 6, the method includes:

S601: An MME acquires information of a UE.

In the field of communications, an MME is a key control node of a 3GPP protocol LTE access network, and is responsible for a process of positioning and paging a UE in an idle mode, and includes a relay. The MME involves a bearer activation/deactivation process, and when a UE is initialized and connected to a network, may select an SGW for the UE. The MME authenticates a user by interacting with an HSS, and allocates a temporary ID to the user. Meanwhile, the MME supports interception and listening of data when permitted by law.

The UE in this embodiment of the present invention may be a mobile phone, an intelligent terminal, a multimedia device, a streaming media device, or the like.

The SGW is responsible for routing and forwarding a user data packet, and is also responsible for user-plane data exchange when the UE moves between eNodeBs and between LTE and another 3GPP technology. For a UE in an idle state, the SGW is used as a node on a downlink data path, and when downlink data arrives, triggers paging of the UE.

Exemplarily, the MME first needs to acquire the information of the UE, so as to perform corresponding determining on the UE according to the information of the UE.

Further, the information of the UE may include a type of the UE or a DRX period of the UE.

Specifically, a method, provided in this embodiment of the present invention, for acquiring, by the MME, the information of the UE, that is, the type of the UE or the DRX period of the UE, may be one of the following:

(1) The MME receives subscription data of the UE from an HSS, and acquires the type of the UE or the DRX period of the UE according to the subscription data of the UE.

(2) The MME receives a NAS (Non access stratum, non access stratum) message/an AS (Access stratum, access stratum) message from the UE, and acquires the type of the UE or the DRX period of the UE according to the NAS message/AS message of the UE.

(3) The MME acquires the type of the UE or the DRX period of the UE according to a preconfigured QoS (Quality of Service, quality of service) of a bearer used by the UE.

S602: The MME determines, according to the information of the UE, whether the UE satisfies a first preset condition.

After acquiring the information of the UE, the MME performs determining on the UE according to the information of the UE, so as to determine whether the UE satisfies the first preset condition, where the first preset condition may be that: the UE is a power-saving UE, or the DRX period of the UE is greater than a first preset threshold.

Specifically, the MME may determine, according to the type of the UE, whether the UE is a UE that needs to save power; or the MME may determine, according to the DRX period of the UE, whether the DRX period of the UE is greater than the first preset threshold, so as to learn whether the UE is in a long DRX period.

A person of ordinary skill in the art may understand that, if the MME determines, according to the type of the UE, that the UE is the power-saving UE, the MME determines that the UE satisfies the first preset condition; correspondingly, if the MME determines, according to the DRX period of the UE, that the DRX period of the UE is greater than the first preset threshold, the MME determines that the UE satisfies the first preset condition.

It should be noted that, as long as the UE satisfies either of the foregoing first preset conditions, the MME can determine that the UE is a UE satisfying the first preset condition, and then, the MME continues to perform the following steps according to the communications method provided in this embodiment of the present invention.

S603: If the UE satisfies the first preset condition, the MME generates a first indication, where the first indication is used for instructing an SGW to retain first data or discard first data, and the first data is downlink data of the UE.

After the MME performs determining on the UE, if the UE satisfies either of the foregoing first preset conditions, the MME may generate the first indication, where the first indication may be used for instructing the SGW to retain the first data for the UE or discard the first data, and the first data is the downlink data of the UE.

Especially, the first indication may include a first paging delaying instruction and/or a first suggested waiting time, or include a first paging delaying instruction and/or a first suggested waiting time, and an EPS (Evolved Packet System, evolved packet system) bearer identifier.

It should be noted that, the first indication may include the first paging delaying instruction; the first suggested waiting time; the first paging delaying instruction and the first suggested waiting time; the first paging delaying instruction and the EPS bearer identifier; the first suggested waiting time and the EPS bearer identifier; or the first paging delaying instruction, the first suggested waiting time, and the EPS bearer identifier. The first indication may be used for indicating that: when the MME determines that the UE is the power-saving UE, the MME needs to delay paging the UE; or when the MME determines that the DRX period of the UE is greater than the first preset threshold, that is, the UE is in a long DRX period, after the MME pages the UE, the UE needs to wait for a period of time before responding to the paging, and further the first indication is used for instructing the SGW to retain the first data for the UE within a period of time, or instructing the SGW to discard the first data.

Specifically, the first indication may include the first paging delaying instruction, and is used for instructing the SGW to determine a first time according to the first paging delaying instruction and retain the first data for the UE within the first time, or is used for instructing the SGW to discard the first data according to the first paging delaying instruction.

It should be noted that, when receiving the first paging delaying instruction, the SGW may determine, according to a time for which the MME delays paging the UE and which is indicated by the first paging delaying instruction, a first time for which the first data is retained for the UE, and retain the first data for the UE within the first time; or when receiving the first paging delaying instruction, the SGW may learn, according to the first paging delaying instruction, that the MME needs to delay paging the UE, and therefore, the SGW may consider that the UE cannot receive the first data within a period of time, that is, the SGW chooses to directly discard the first data.

Alternatively,
the first indication may include the first suggested waiting time, and is used for instructing the SGW to retain the first data for the UE within the first suggested waiting time.

Alternatively,
the first indication may include the first paging delaying instruction and the first suggested waiting time, and is used for instructing the SGW to retain the first data for the UE within the first suggested waiting time after the SGW determines, according to the first paging delaying instruction, that the MME needs to delay paging the UE.

Alternatively,
the first indication may include the first paging delaying instruction and the EPS bearer identifier, and is used for instructing the SGW to determine a first time according to the first paging delaying instruction and retain, for the UE within the first time, the first data corresponding to the EPS bearer identifier, or is used for instructing the SGW to discard, according to the first paging delaying instruction, the first data corresponding to the EPS bearer.

Alternatively,
the first indication may include the first suggested waiting time and the EPS bearer identifier, and is used for instructing the SGW to retain, for the UE within the first suggested waiting time, the first data corresponding to the EPS bearer identifier.

Alternatively,
the first indication may include the first paging delaying instruction, the first suggested waiting time, and the EPS bearer identifier, and is used for instructing the SGW to retain, for the UE within the first suggested waiting time, the first data corresponding to the EPS bearer identifier after the SGW determines, according to the first paging delaying instruction, that the MME needs to delay paging the UE.

It should be noted that, if the first indication includes the first paging delaying instruction, or the first paging delaying instruction and the EPS bearer identifier, the first time for which the SGW retains the first data is a time estimated by the SGW; and if the first indication includes the first suggested waiting time, or the first paging delaying instruction and the first suggested waiting time, or the first suggested waiting time and the EPS bearer identifier, or the first paging delaying instruction, the first suggested waiting time, and the EPS bearer identifier, the first suggested waiting time for which the SGW retains the first data is a suggested time provided by the MME.

It may be understood that, the EPS bearer identifier included in the first indication may be used to indicate a bearer, on which the first indication is based, of the UE. Certainly, if the first indication does not include the EPS bearer identifier, the first indication is based on the UE, that is, the first indication may be aimed at only downlink data on some bearers of the UE, or may be aimed at all downlink data of the UE, where the bearer, which is provided in this embodiment of the present invention, of the UE may be understood as a data channel for data transmission between the UE and a network.

S604: The MME sends the first indication to the SGW.

After generating the first indication, the MME adds the first indication into a message, and sends the message to the SGW, so that the SGW may retain the first data for the UE or discard the first data according to the first indication in the message.

It should be noted that the message may be an existing message, or may be a newly-defined message. Specifically, a method for sending, by the MME, the first indication to the SGW may be one of the following:

(1) After receiving a downlink data notification message from the SGW, the MME sends a downlink data notification acknowledgment message (that is, the message is an existing message) corresponding to the downlink data notification message to the SGW, where the downlink data notification acknowledgment message carries the first indication.

(2) The MME sends a path bearer releasing request message (that is, the message is an existing message) to the SGW, where the path bearer releasing request message carries the first indication.

(3) The MME sends a newly-defined message (that is, the message is a newly-defined message) to the SGW, where the newly-defined message carries the first indication.

In this embodiment of the present invention, the message may be a newly-defined message, and the newly-defined message carries the first indication; or the message may be an existing message, and the existing message carries the first indication. Specifically, the newly-defined message may be a message, which satisfies an instruction function of the first indication, in any format; and is not limited in the present invention.

Especially, that the existing message carries the first indication may be that a new cause value is added into the existing message, that is, "in order to save power, paging of the UE is delayed", so as to indicate that because the MME delays paging the UE or the UE is in a long DRX period and needs to wait for a period of time before responding to the paging, the SGW may wait for a period of time before transmitting and receiving the downlink data of the UE (that is, the SGW needs to buffer the downlink data of the UE for a period of time); or may be that a new IE (Information Element, information element) is added into the existing message, that is, "the first paging delaying instruction and/or the first suggested waiting time", or "the first paging delaying instruction and/or the first suggested waiting time, and the EPS bearer identifier"; or may be that when a new cause value is added into the existing message, a new IE, that is, the first suggested waiting time, is also added.

A person of ordinary skill in the art may understand that, if the first indication is carried in the newly-defined message, the MME sends the first indication to the SGW by sending the newly-defined message; and if the first indication is carried in the existing message, the MME may send the first indication to the SGW by sending the existing message.

Especially, if the first indication is carried in the newly-defined message, the MME may send, before receiving the downlink data notification message from the SGW or after receiving the downlink data notification message from the SGW, the first indication to the SGW by sending the newly-defined message; correspondingly, the MME may send, before sending the path bearer releasing request message to the SGW or after sending the path bearer releasing request message to the SGW, the first indication to the SGW by sending the newly-defined message.

Further, the path bearer releasing request message in (2) is sent by the MME to the SGW when the UE is previously disconnected from the network.

S605: The SGW processes the first data according to the first indication.

After receiving the first indication from the MME, the SGW may retain the first data for the UE within a period of time or directly discard the first data according to the first indication, and in this way, for a case in which the SGW does not send the first data, that is, the downlink data of the UE, within a period of time, the SGW may not consider that the case is caused by the fact that an error or exception occurs.

S606: If subscription data of the UE, a QoS parameter of a bearer used by the UE, or a state of the UE changes, the MME generates a second indication according to subscription data of the UE, a QoS parameter of the bearer used by the UE, or a state of the UE that is obtained after the change, where the second indication is used for instructing the SGW to normally transmit and receive the first data.

If the subscription data of the UE, the QoS parameter of the bearer used by the UE, or the state of the UE changes, that is, if the subscription data of the UE and the QoS parameter of the bearer used by the UE is modified, or the UE has actively initiated a connection to the network and establishes a data channel within the foregoing period of time, the MME may generate the second indication according to the subscription data of the UE, the QoS parameter of the bearer used by the UE, or the state of the UE that is obtained after the change, where the second indication may be used for instructing the SGW to normally transmit and receive the first data.

It should be noted that, related information of the UE includes, but is not limited to the two pieces of information of the UE, which are the subscription data of the UE and the QoS parameter of the bearer used by the UE, that is, if other related information of the UE changes, the MME may also generate the second indication according to related information of the UE that is obtained after the change.

S607: The MME sends the second indication to the SGW.

After generating the second indication, the MME sends the second indication to the SGW, so as to instruct the SGW to normally transmit and receive the first data.

S608: The SGW processes the first data according to the second indication.

After receiving the second indication from the MME, the SGW may normally transmit and receive the first data according to the second indication, that is, the SGW may continue to transmit and receive the first data that needs to be sent to the UE.

It should be noted that, the second indication sent by the MME to the SGW may be carried in a newly-defined message, that is, the newly-defined message carries an indication for instructing the SGW to stop buffering the first data; or may be carried in the newly-defined message that is provided in this embodiment of the present invention and carries the first indication, and the first suggested waiting time in the first indication in the newly-defined message carrying the first indication needs to be set to 0 or another similar value representing the meaning, which is not limited in the present invention.

In this embodiment of the present invention, the SGW may learn, according to the first indication received from the MME, that the UE may need to wait for a period of time before establishing a signaling and data channel with a network, to implement transmission of the first data; therefore, the SGW may buffer the first data, that is, the downlink data of the UE, for a period of time according to the first indication; and in this way, for a case in which the SGW does not send the downlink data of the UE within a period of time, the SGW may not consider that the case is caused by the fact that an error or exception occurs. After the subscription data of the UE, the QoS parameter of the bearer used by the UE, or the state of the UE changes, the MME may generate the second indication according to the subscription data of the UE, the QoS parameter of the bearer used by the UE, or the state of the UE that is obtained after the change, and sends the second indication to the SGW, so as to instruct the SGW to continue to transmit and receive the first data that needs to be sent to the UE, so that the SGW can process the first data more flexibly.

According to the communications method provided in this embodiment of the present invention, an MME acquires information of a UE; the MME determines, according to the information of the UE, whether the UE satisfies a first preset condition; if the UE satisfies the first preset condition, the MME generates a first indication, where the first indication is used for instructing an SGW to retain first data or discard first data, and the first data is downlink data of the UE; and the MME sends the first indication to the SOW, so that the SGW processes the first data according to the first indication. By using this solution, if the UE satisfies the first preset condition, the MME sends a corresponding first indication to the SOW, so that when receiving the downlink data of the UE from a network, the SGW can buffer the downlink data of the UE for a long time according to the first indication. In this way, the SGW may not consider that buffering the downlink data of the UE for a long time is caused by the fact that an error or exception occurs, thereby solving the problem in the prior art that, in order to save power, when the MME delays delivering a paging message or the UE uses a long DRX period, an exception may occur in the SGW.

Figure 7:
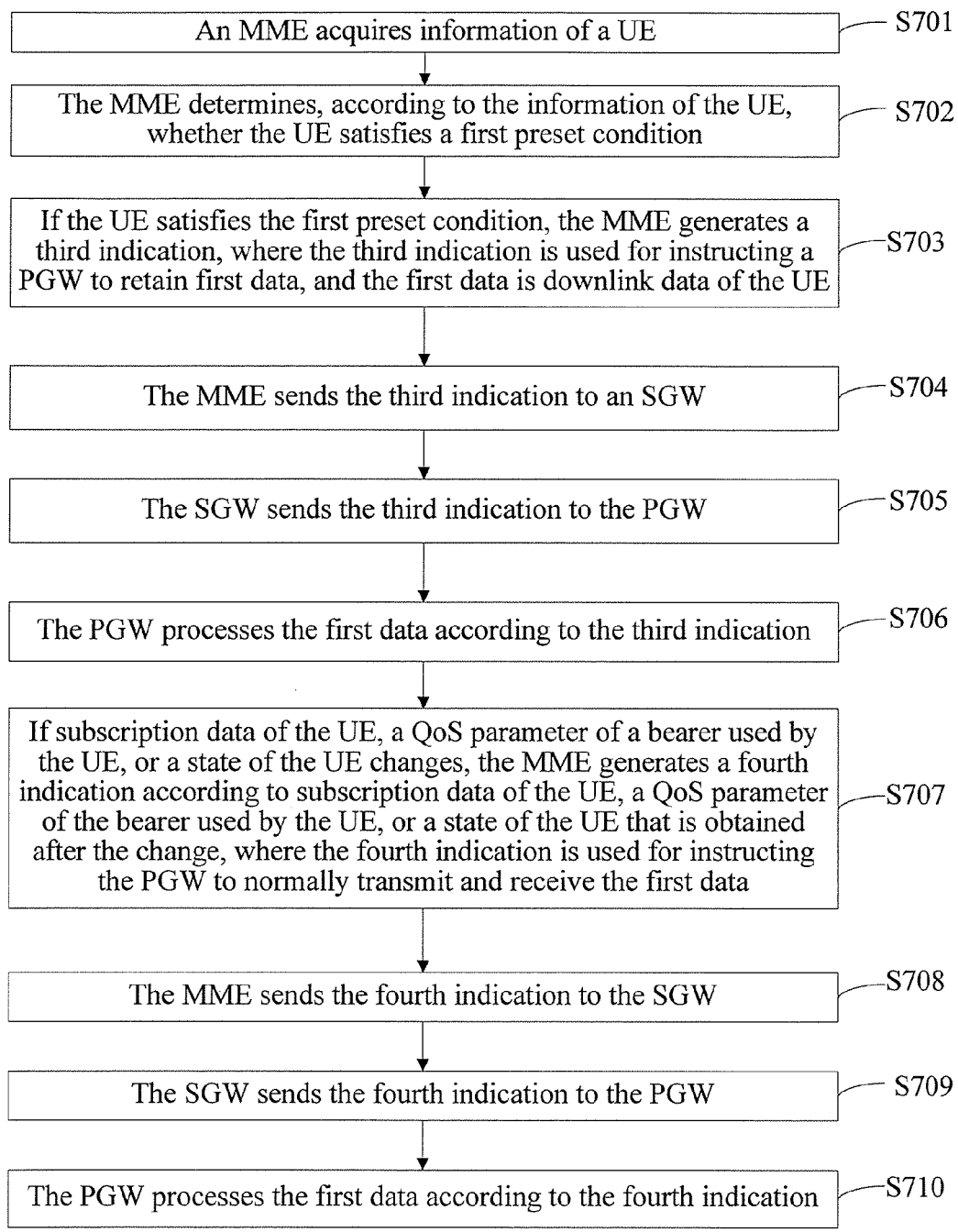
FIG. 7 is a fourth flowchart of another communications method according to an embodiment of the present invention.

This embodiment of the present invention provides another communications method. As shown in FIG. 7, the method includes:

S701: An MME acquires information of a UE.

Exemplarily, the MME first needs to acquire the information of the UE, so as to perform corresponding determining on the UE according to the information of the UE.

Further, the information of the UE may include a type of the UE or a DRX period of the UE.

Specifically, a method, provided in this embodiment of the present invention, for acquiring, by the MME, the information of the UE, that is, the type of the UE or the DRX period of the UE, may be one of the following:

(1) The MME receives subscription data of the UE from an HSS, and acquires the type of the UE or the DRX period of the UE according to the subscription data of the UE.

(2) The MME receives a NAS message/an AS message from the UE, and acquires the type of the UE or the DRX period of the UE according to the NAS message/AS message of the UE.

(3) The MME acquires the type of the UE or the DRX period of the UE according to a preconfigured QoS of a bearer used by the UE.

S702: The MME determines, according to the information of the UE, whether the UE satisfies a first preset condition.

After acquiring the information of the UE, the MME performs determining on the UE according to the information of the UE, so as to determine whether the UE satisfies the first preset condition, where the first preset condition may be that: the UE is a power-saving UE, or the DRX period of the UE is greater than a first preset threshold.

Specifically, the MME may determine, according to the type of the UE, whether the UE is a UE that needs to save power; or the MME may determine, according to the DRX period of the UE, whether the DRX period of the UE is greater than the first preset threshold, so as to learn whether the UE is in a long DRX period.

A person of ordinary skill in the art may understand that, if the MME determines, according to the type of the UE, that the UE is the power-saving UE, the MME determines that the UE satisfies the first preset condition; correspondingly, if the MME determines, according to the DRX period of the UE, that the DRX period of the UE is greater than the first preset threshold, the MME determines that the UE satisfies the first preset condition.

It should be noted that, as long as the UE satisfies either of the foregoing first preset conditions, the MME can determine that the UE is a UE satisfying the first preset condition, and then, the MME continues to perform the following steps according to the communications method provided in this embodiment of the present invention.

S703: If the UE satisfies the first preset condition, the MME generates a third indication, where the third indication is used for instructing a PGW to retain first data, and the first data is downlink data of the UE.

After the MME performs determining on the UE, if the UE satisfies either of the foregoing first preset conditions, the MME may generate the third indication, where the third indication may be used for instructing the PGW to retain the first data for the UE, and the first data is the downlink data of the UE.

Especially, the third indication may include a third paging delaying instruction and/or a third suggested waiting time, or include a third paging delaying instruction and/or a third suggested waiting time, and an EPS bearer identifier.

It should be noted that, the third indication may include the third paging delaying instruction; the third suggested waiting time; the third paging delaying instruction and the third suggested waiting time; the third paging delaying instruction and the EPS bearer identifier; the third suggested waiting time and the EPS bearer identifier; or the third paging delaying instruction, the third suggested waiting time, and the EPS bearer identifier. The third indication may be used for indicating that: when the MME determines that the UE is the power-saving UE, the MME needs to delay paging the UE; or when the MME determines that the DRX period of the UE is greater than the first preset threshold, that is, the UE is in a long DRX period, after the MME pages the UE, the UE needs to wait for a period of time before responding to the paging, and further the third indication is used for instructing the PGW to retain the first data for the UE within a period of time.

Specifically, the third indication may include the third paging delaying instruction, and is used for instructing the PGW to determine a first time according to the third paging delaying instruction, retain the first data for the UE within the first time, and send the first data to an SGW after the first time.

It should be noted that, when receiving the third paging delaying instruction, the PGW may determine, according to a time for which the MME delays paging the UE and which is indicated by the third paging delaying instruction, a first time for which the first data is retained for the UE, retain the first data for the UE within the first time, and send the first data to the SGW after the first time.

Alternatively, the third indication may include the third suggested waiting time, and is used for instructing the PGW to retain the first data for the UE within the third suggested waiting time, and send the first data to the SGW after the third suggested waiting time.

Alternatively, the third indication may include the third paging delaying instruction and the third suggested waiting time, and is used for instructing the PGW to retain the first data for the UE within the third suggested waiting time after the PGW determines, according to the third paging delaying instruction, that the MME needs to delay paging the UE, and send the first data to the SGW after the third suggested waiting time.

Alternatively, the third indication may include the third paging delaying instruction and the EPS bearer identifier, and is used for instructing the PGW to determine a first time according to the third paging delaying instruction, retain, for the UE within the first time, the first data corresponding to the EPS bearer identifier, and send the first data corresponding to the EPS bearer identifier to the SGW after the first time.

Alternatively, the third indication may include the third suggested waiting time and the EPS bearer identifier, and is used for instructing the PGW to retain, for the UE within the third suggested waiting time, the first data corresponding to the EPS bearer identifier, and send the first data corresponding to the EPS bearer identifier to the SGW after the third suggested waiting time.

Alternatively, the third indication may include the third paging delaying instruction, the third suggested waiting time, and the EPS bearer identifier, and is used for instructing the PGW to retain, for the UE within the third suggested waiting time, the first data corresponding to the EPS bearer identifier after the PGW determines, according to the third paging delaying instruction, that the MME needs to delay paging the UE, and send the first data corresponding to the EPS bearer identifier to the SGW after the third suggested waiting time.

It should be noted that, if the third indication includes the third paging delaying instruction, or the third paging delaying instruction and the EPS bearer identifier, the first time for which the PGW retains the first data is a time estimated by the PGW; and if the third indication includes the third suggested waiting time, or the third paging delaying instruction and the third suggested waiting time, or the third suggested waiting time and the EPS bearer identifier, or the third paging delaying instruction, the third suggested waiting time, and the EPS bearer identifier, the third suggested waiting time for which the PGW retains the first data is a suggested time provided by the MME.

It may be understood that, the EPS bearer identifier included in the third indication may be used to indicate a bearer, on which the third indication is based, of the UE. Certainly, if the third indication does not include the EPS bearer identifier, the third indication is based on the UE, that is, the third indication may be aimed at only downlink data on some bearers of the UE, or may be aimed at all downlink data of the UE, where the bearer, which is provided in this embodiment of the present invention, of the UE may be understood as a data channel for data transmission between the UE and a network.

S704: The MME sends the third indication to the SGW.

After generating the third indication, the MME adds the third indication into a message, and sends the message to the SGW, so that the SGW may further send the message to the PGW.

The PGW provides interface transmission at a connection point between the UE and an external packet data network. One UE may access multiple packet data networks by using multiple PGWs at the same time. The PGW implements an instruction to control data packet filtering, charging support, authorized interception, and data packet screening for each user. Another key function of the PGW is that the PGW is used as a core component of data exchange to bear data exchange between a 3GPP network and a non-3GPP network.

It should be noted that the message may be an existing message, or may be a newly-defined message. Specifically, a method for sending, by the MME, the third indication to the SGW may be one of the following:

(1) After receiving a downlink data notification message from the SGW, the MME sends a downlink data notification acknowledgment message (that is, the message is an existing message) corresponding to the downlink data notification message to the SGW, where the downlink data notification acknowledgment message carries the third indication.

(2) The MME sends a path bearer releasing request message (that is, the message is an existing message) to the SGW, where the path bearer releasing request message carries the third indication.

(3) The MME sends a newly-defined message (that is, the message is a newly-defined message) to the SGW, where the newly-defined message carries the third indication.

In this embodiment of the present invention, the message may be a newly-defined message, and the newly-defined message carries the third indication; or the message may be an existing message, and the existing message carries the third indication. Specifically, the newly-defined message may be a message, which satisfies an instruction function of the third indication, in any format; and is not limited in the present invention.

Especially, that the existing message carries the third indication may be that a new cause value is added into the existing message, that is, "in order to save power, paging of the UE is delayed", so as to indicate that because the MME delays paging the UE or the UE is in a long DRX period and needs to wait for a period of time before responding to the paging, the PGW may wait for a period of time before transmitting and receiving the downlink data of the UE (that is, the PGW needs to buffer the downlink data of the UE for a period of time); or may be that a new IE is added into the existing message, that is, "the third paging delaying instruction and/or the third suggested waiting time", or "the third paging delaying instruction and/or the third suggested waiting time, and the EPS bearer identifier"; or may be that when a new cause value is added into the existing message, a new IE, that is, the third suggested waiting time, is also added.

A person of ordinary skill in the art may understand that, if the third indication is carried in the newly-defined message, the MME sends the third indication to the SGW by sending the newly-defined message; and if the third indication is carried in the existing message, the MME may send the third indication to the SGW by sending the existing message.

Especially, if the third indication is carried in the newly-defined message, the MME may send, before receiving the downlink data notification message from the SGW or after receiving the downlink data notification message from the SGW, the third indication to the SGW by sending the newly-defined message; correspondingly, the MME may send, before sending the path bearer releasing request message to the SGW or after sending the path bearer releasing request message to the SGW, the third indication to the SGW by sending the newly-defined message.

Further, the path bearer releasing request message in (2) is sent by the MME to the SGW when the UE is previously disconnected from the network.

S705: The SGW sends the third indication to the PGW.

After receiving the third indication from the MME, the SGW may further send the third indication to the PGW, so that the PGW may retain the first data for the UE within a period of time according to the third indication and send the first data to the SGW after the period of time.

It should be noted that the third indication may be carried in another message, where the another message may be an existing message, or may be a newly-defined message. If the third indication is carried in a newly-defined message, after receiving the message from the MME, the SGW may send the third indication to the PGW by sending the another message; and if the third indication is carried in an existing message, the SGW may send the third indication to the PGW by sending the existing message. Specifically, a method for sending, by the SGW, the third indication to the PGW may be one of the following:

(1) The SGW sends a default bearer establishment request message (that is, the another message is an existing message) to the PGW, where the default bearer establishment request message carries the third indication.

(2) The SGW sends a newly-defined message (that is, the another message is a newly-defined message) to the PGW, where the newly-defined message carries the third indication.

Especially, the newly-defined message in (2) may be the newly-defined message sent by the MME to the SGW, that is, after receiving the newly-defined message, the SGW sends the newly-defined message to the PGW; or may be another newly-defined message sent by the SGW to the POW, that is, the message and the another message both are newly-defined messages, and the message and the another message may be the same message, or may be different messages.

S706: The PGW processes the first data according to the third indication.

After receiving the third indication from the SGW, the PGW may retain the first data for the UE within a period of time according to the third indication, and send the first data to the SGW after the period of time, so that the SGW further sends the first data to the UE, to complete a process of delivering the first data; and in this way, for a case in which the PGW does not send the first data, that is, the downlink data of the UE, to the SGW within a period of time, the SGW may not consider that the case is caused by the fact that an error or exception occurs.

Further, the PGW may also refuse, according to the third indication, to receive the downlink data of the UE delivered by the network; and in this way, the PGW may not deliver too much downlink data of the UE to the SGW, so as to avoid that a buffer capacity of the SGW is exceeded because the SGW retains too much downlink data of the UE.

S707: If subscription data of the UE, a QoS parameter of a bearer used by the UE, or a state of the UE changes, the MME generates a fourth indication according to subscription data of the UE, a QoS parameter of the bearer used by the UE, or a state of the UE that is obtained after the change, where the fourth indication is used for instructing the PGW to normally transmit and receive the first data.

If the subscription data of the UE, the QoS parameter of the bearer used by the UE, or the state of the UE changes, that is, if the subscription data of the UE and the QoS parameter of the bearer used by the UE is modified, or the UE has actively initiated a connection to the network and establishes a data channel within the foregoing period of time, the MME may generate the fourth indication according to the subscription data of the UE, the QoS parameter of the bearer used by the UE, or the state of the UE that is obtained after the change, where the fourth indication may be used for instructing the PGW to normally transmit and receive the first data.

It should be noted that, related information of the UE includes, but is not limited to the two pieces of information of the UE, which are the subscription data of the UE and the QoS parameter of the bearer used by the UE, that is, if other related information of the UE changes, the MME may also generate the fourth indication according to related information of the UE that is obtained after the change.

S708: The MME sends the fourth indication to the SGW.

After generating the fourth indication, the MME sends the fourth indication to the SGW, so that the SGW sends the fourth indication to the PGW.

S709: The SGW sends the fourth indication to the POW.

After receiving the fourth indication from the MME, the SGW may further send the fourth indication to the PGW, so that the PGW normally transmits and receives the first data according to the fourth indication.

S710: The PGW processes the first data according to the fourth indication.

After receiving the fourth indication from the SGW, the PGW may normally transmit and receive the first data according to the fourth indication, that is, the PGW may continue to transmit and receive the first data that needs to be sent to the UE.

It should be noted that, the fourth indication sent by the MME to the SGW and then sent by the SGW to the PGW may be carried in a newly-defined message, that is, the newly-defined message carries an indication for instructing the PGW to stop buffering the first data; or may be carried in the newly-defined message or the another message provided in this embodiment of the present invention, and the third suggested waiting time in the third indication in the newly-defined message or the another message needs to be set to 0 or another similar value representing the meaning, which is not limited in the present invention.

In this embodiment of the present invention, the PGW may learn, according to the third indication received from the SGW, that the UE may need to wait for a period of time before establishing a signaling and data channel to a network, to implement transmission of the first data; therefore, the PGW may buffer the first data, that is, the downlink data of the UE, for a period of time according to the third indication; and in this way, for a case in which the PGW does not send the downlink data of the UE within a period of time, the SGW may not consider that the case is caused by the fact that an error or exception occurs; or the PGW may refuse, according to the third indication, to receive the downlink data of the UE delivered by a network, and in this way, the PGW may not deliver too much downlink data of the UE to the SGW, so as to avoid that a buffer capacity of the SGW is exceeded because the SGW retains too much downlink data of the UE. After the subscription data of the UE, the QoS parameter of the bearer used by the UE, or the state of the UE changes, the MME may generate the fourth indication according to the subscription data of the UE, the QoS parameter of the bearer used by the UE, or the state of the UE that is obtained after the change, and sends the fourth indication to the SGW, so that the SGW sends the fourth indication to the PGW, so as to instruct the PGW to continue to transmit and receive the first data that needs to be sent to the UE, so that the PGW can process the first data more flexibly.

According to the another communications method provided in this embodiment of the present invention, an MME acquires information of a UE; the MME determines, according to the information of the UE, whether the UE satisfies a first preset condition; if the UE satisfies the first preset condition, the MME generates a third indication, where the third indication is used for instructing a PGW to retain first data, and the first data is downlink data of the UE; and the MME sends the third indication to an SGW, so that the SGW sends the third indication to the PGW, and further, the PGW processes the first data according to the third indication. By using this solution, if the UE satisfies the first preset condition, the MME sends a corresponding third indication to the SGW, so that the SGW further sends the third indication to the PGW, and further, when receiving the downlink data of the UE from a network, the PGW can buffer the downlink data of the UE for a long time according to the third indication, and does not send the downlink data to the SGW immediately. In this way, an error or exception may not be caused by the fact that the SGW needs to buffer the downlink data of the UE for a long time, thereby solving the problem in the prior art that, in order to save power, when the MME delays delivering a paging message or the UE uses a long DRX period, an exception may occur in the SGW.

Embodiment 3

Figure 8:
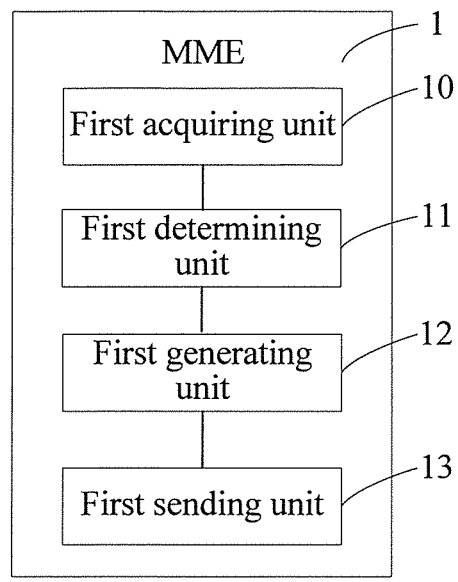
FIG. 8 is a first schematic structural diagram of an MME according to an embodiment of the present invention.

As shown in FIG. 8, this embodiment of the present invention provides an MME 1, corresponding to the communications method on the MME side provided in the embodiment of the present invention. The MME 1 includes:

a first acquiring unit 10, configured to acquire information of a UE;

a first determining unit 11, configured to determine, according to the information of the UE acquired by the first acquiring unit 10, whether the UE satisfies a first preset condition;

a first generating unit 12, configured to: if the first determining unit 11 determines that the UE satisfies the first preset condition, generate a first indication, where the first indication is used for instructing an SGW to retain first data or discard the first data, and the first data is downlink data of the UE; and a first sending unit 13, configured to send the first indication generated by the first generating unit 12 to the SGW, so that the SGW processes the first data according to the first indication.

Further the information of the UE acquired by the first acquiring unit 10 may include a type of the UE; and the first preset condition is that the UE is a power-saving UE; and the first determining unit 11 is configured to determine, according to the type of the UE, whether the UE is the power-saving UE.

Further, the information of the UE acquired by the first acquiring unit 10 may include a DRX period of the UE; and the first preset condition is that the DRX period of the UE is greater than a first preset threshold; and the first determining unit 11 is configured to determine, according to the DRX period of the UE, whether the DRX period of the UE is greater than the first preset threshold.

Further, the first indication generated by the first generating unit 12 includes a first paging delaying instruction, and is used for instructing the SGW to determine a first time according to the first paging delaying instruction and retain the first data within the first time, or is used for instructing the SGW to discard the first data according to the first paging delaying instruction;

or, the first indication generated by the first generating unit 12 includes a first suggested waiting time, and is used for instructing the SGW to retain the first data within the first suggested waiting time;

or, the first indication generated by the first generating unit 12 includes the first paging delaying instruction and the first suggested waiting time, and is used for instructing the SGW to retain the first data within the first suggested waiting time after the SGW determines, according to the first paging delaying instruction, that the MME needs to delay paging the UE;

or, the first indication generated by the first generating unit 12 includes the first paging delaying instruction and an EPS bearer identifier, and is used for instructing the SGW to determine the first time according to the first paging delaying instruction and retain, within the first time, the first data corresponding to the EPS bearer identifier, or is used for instructing the SGW to discard, according to the first paging delaying instruction, the first data corresponding to the EPS bearer identifier;

or, the first indication generated by the first generating unit 12 includes the first suggested waiting time and the EPS bearer identifier, and is used for instructing the SGW to retain, within the first suggested waiting time, the first data corresponding to the EPS bearer identifier;

or, the first indication generated by the first generating unit 12 includes the first paging delaying instruction, the first suggested waiting time, and the EPS bearer identifier, and is used for instructing the SGW to retain, within the first suggested waiting time, the first data corresponding to the EPS bearer identifier after the SGW determines, according to the first paging delaying instruction, that the MME needs to delay paging the UE.

Figure 9:
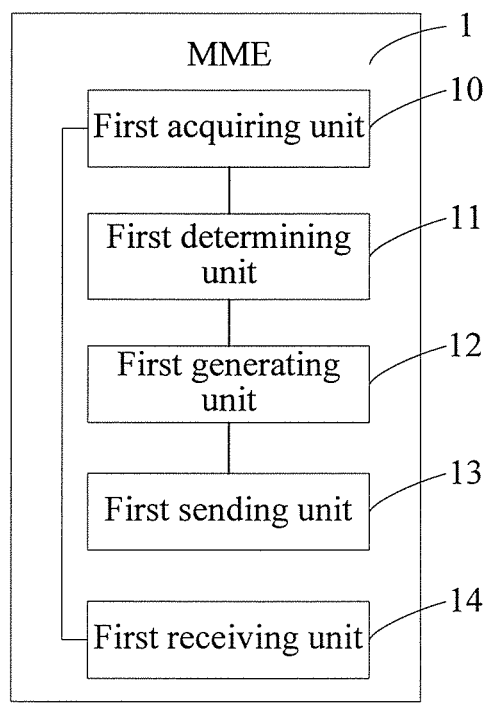
FIG. 9 is a second schematic structural diagram of an MME according to an embodiment of the present invention.

Further, as shown in FIG. 9, the MME 1 further includes:

a first receiving unit 14, configured to receive subscription data of the UE from an HSS; where the first acquiring unit 10 is configured to acquire the information of the UE according to the subscription data of the UE received by the first receiving unit 14;

or, the first receiving unit 14 is configured to receive a NAS message/an AS message from the UE, and the first acquiring unit 10 is configured to acquire the information of the UE according to the NAS message/AS message of the UE received by the first receiving unit 14;

or, the first acquiring unit 10 is configured to acquire the information of the UE according to a pre-configured QoS parameter of a bearer used by the UE.

Further, the first generating unit 12 is further configured to: if the subscription data of the UE, the QoS parameter of the bearer used by the UE, or a state of the UE changes, generate a second indication according to subscription data of the UE, a QoS parameter of the bearer used by the UE, or a state of the UE that is obtained after the change, where the second indication is used for instructing the SGW to normally transmit and receive the first data; and the first sending unit 13 is further configured to send the second indication generated by the first generating unit 12 to the SGW, so that the SGW processes the first data according to the second indication.

According to the MME provided in this embodiment of the present invention, the MME acquires information of a UE; the MME determines, according to the information of the UE, whether the UE satisfies a first preset condition; if the UE satisfies the first preset condition, the MME generates a first indication, where the first indication is used for instructing an SGW to retain first data or discard first data, and the first data is downlink data of the UE; and the MME sends the first indication to the SGW, so that the SGW processes the first data according to the first indication. By using this solution, if the UE satisfies the first preset condition, the MME sends a corresponding first indication to the SGW, so that when receiving the downlink data of the UE from a network, the SGW can buffer the downlink data of the UE for a long time according to the first indication. In this way, the SGW may not consider that buffering the downlink data of the UE for a long time is caused by the fact that an error or exception occurs, thereby solving the problem in the prior art that, in order to save power, when the MME delays delivering a paging message or the UE uses a long DRX period, an exception may occur in the SGW.

Figure 10:
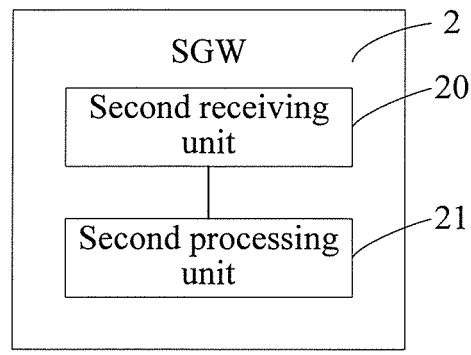
FIG. 10 is a first schematic structural diagram of an SGW according to an embodiment of the present invention.

As shown in FIG. 10, this embodiment of the present invention provides an SGW 2, corresponding to the communications method on the SGW side provided in the embodiment of the present invention. The SGW 2 includes:

a second receiving unit 20, configured to receive a first indication from an MME, where the first indication is generated by the MME when the MME acquires information of a UE and determines, according to the information of the UE, that the UE satisfies a first preset condition, the first indication is used for instructing the SGW to retain first data or discard the first data, and the first data is downlink data of the UE; and a second processing unit 21, configured to process the first data according to the first indication received by the second receiving unit 20.

Further, the first indication received by the second receiving unit 20 includes a first paging delaying instruction, and is used for instructing the second processing unit 21 to determine a first time according to the first paging delaying instruction and retain the first data within the first time, or is used for instructing the second processing unit 21 to discard the first data according to the first paging delaying instruction;

or, the first indication received by the second receiving unit 20 includes a first suggested waiting time, and is used for instructing the second processing unit 21 to retain the first data within the first suggested waiting time;

or, the first indication received by the second receiving unit 20 includes the first paging delaying instruction and the first suggested waiting time, and is used for instructing the second processing unit 21 to retain the first data within the first suggested waiting time after the second processing unit 21 determines, according to the first paging delaying instruction, that the MME needs to delay paging the UE;

or, the first indication received by the second receiving unit 20 includes the first paging delaying instruction and an EPS bearer identifier, and is used for instructing the second processing unit 21 to determine the first time according to the first paging delaying instruction and retain, within the first time, the first data corresponding to the EPS bearer identifier, or is used for instructing the second processing unit 21 to discard, according to the first paging delaying instruction, the first data corresponding to the EPS bearer identifier;

or, the first indication received by the second receiving unit 20 includes the first suggested waiting time and the EPS bearer identifier, and is used for instructing the second processing unit 21 to retain, within the first suggested waiting time, the first data corresponding to the EPS bearer identifier;

or, the first indication received by the second receiving unit 20 includes the first paging delaying instruction, the first suggested waiting time, and the EPS bearer identifier, and is used for instructing the second processing unit 21 to retain, within the first suggested waiting time, the first data corresponding to the EPS bearer identifier after the second processing unit 21 determines, according to the first paging delaying instruction, that the MME needs to delay paging the UE.

Further, the second receiving unit 20 is further configured to receive a second indication from the MME, where the second indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the second indication is used for instructing the SGW to normally transmit and receive the first data; and the second processing unit 21 is further configured to process the first data according to the second indication received by the second receiving unit 20.

According to the SGW provided in this embodiment of the present invention, the SGW receives a first indication from an MME, where the first indication is generated by the MME when the MME acquires information of a UE and determines, according to the information of the UE, that the UE satisfies a first preset condition, the first indication is used for instructing the SGW to retain first data or discard first data, and the first data is downlink data of the UE; and the SGW processes the first data according to the first indication. By using this solution, if the UE satisfies the first preset condition, the MME sends a corresponding first indication to the SGW, so that when receiving the downlink data of the UE from a network, the SGW can buffer the downlink data of the UE for a long time according to the first indication. In this way, the SGW may not consider that buffering the downlink data of the UE for a long time is caused by the fact that an error or exception occurs, thereby solving the problem in the prior art that, in order to save power, when the MME delays delivering a paging message or the UE uses a long DRX period, an exception may occur in the SGW.

As shown in FIG. 8, this embodiment of the present invention provides an MME 1, corresponding to the another communications method on the MME side provided in the embodiment of the present invention. The MME 1 includes:

a first acquiring unit 10, configured to acquire information of a UE;

a first determining unit 11, configured to determine, according to the information of the UE acquired by the first acquiring unit 10, whether the UE satisfies a first preset condition;

a first generating unit 12, configured to: if the first determining unit 11 determines that the UE satisfies the first preset condition, generate a third indication, where the third indication is used for instructing a PGW to retain first data, and the first data is downlink data of the UE; and a first sending unit 13, configured to send the third indication generated by the first generating unit 12 to an SGW, so that the SGW sends the third indication to the PGW, and further, the PGW processes the first data according to the third indication.

Further, the information of the UE acquired by the first acquiring unit 10 may include a type of the UE; and the first preset condition is that the UE is a power-saving UE; and the first determining unit 11 is configured to determine, according to the type of the UE, whether the UE is the power-saving UE.

Further, the information of the UE acquired by the first acquiring unit 10 may include a DRX period of the UE; and the first preset condition is that the DRX period of the UE is greater than a first preset threshold; and the first determining unit 11 is configured to determine, according to the DRX period of the UE, whether the DRX period of the UE is greater than the first preset threshold.

Further, the third indication generated by the first generating unit 12 includes a third paging delaying instruction, and is used for instructing the PGW to determine a first time according to the third paging delaying instruction, retain the first data within the first time, and send the first data to the SGW after the first time;

or, the third indication generated by the first generating unit 12 includes a third suggested waiting time, and is used for instructing the PGW to retain the first data within the third suggested waiting time, and send the first data to the SGW after the third suggested waiting time;

or, the third indication generated by the first generating unit 12 includes the third paging delaying instruction and the third suggested waiting time, and is used for instructing the PGW to retain the first data within the third suggested waiting time after the PGW determines, according to the third paging delaying instruction, that the MME needs to delay paging the UE, and send the first data to the SGW after the third suggested waiting time;

or, the third indication generated by the first generating unit 12 includes the third paging delaying instruction and an EPS bearer identifier, and is used for instructing the PGW to determine the first time according to the third paging delaying instruction, retain, within the first time, the first data corresponding to the EPS bearer identifier, and send the first data corresponding to the EPS bearer identifier to the SGW after the first time;

or, the third indication generated by the first generating unit 12 includes the third suggested waiting time and the EPS bearer identifier, and is used for instructing the PGW to retain, within the third suggested waiting time, the first data corresponding to the EPS bearer identifier, and send the first data corresponding to the EPS bearer identifier to the SGW after the third suggested waiting time;

or, the third indication generated by the first generating unit 12 includes the third paging delaying instruction, the third suggested waiting time, and the EPS bearer identifier, and is used for instructing the PGW to retain, within the third suggested waiting time, the first data corresponding to the EPS bearer identifier after the PGW determines, according to the third paging delaying instruction, that the MME needs to delay paging the UE, and send the first data corresponding to the EPS bearer identifier to the SGW after the third suggested waiting time.

Further, as shown in FIG. 9, the MME 1 further includes:

a first receiving unit 14, configured to receive subscription data of the UE from an HSS; where the first acquiring unit 10 is configured to acquire the information of the UE according to the subscription data of the UE received by the first receiving unit 14;

or, the first receiving unit 14 is configured to receive a NAS message/an AS message from the UE, and the first acquiring unit 10 is configured to acquire the information of the UE according to the NAS message/AS message received by the first receiving unit 14;

or, the first acquiring unit 10 is configured to acquire the information of the UE according to a pre-configured QoS parameter of a bearer used by the UE.

Further, the first generating unit 12 is further configured to: if the subscription data of the UE, the QoS parameter of the bearer used by the UE, or a state of the UE changes, generate a fourth indication according to subscription data of the UE, a QoS parameter of the bearer used by the UE, or a state of the UE that is obtained after the change, where the fourth indication is used for instructing the PGW to normally transmit and receive the first data; and the first sending unit 13 is further configured to send the fourth indication generated by the first generating unit 12 to the SGW, so that the SGW sends the fourth indication to the PGW, and further, the PGW processes the first data according to the fourth indication.

According to the MME provided in this embodiment of the present invention, the MME acquires information of a UE; the MME determines, according to the information of the UE, whether the UE satisfies a first preset condition; if the UE satisfies the first preset condition, the MME generates a third indication, where the third indication is used for instructing a PGW to retain first data, and the first data is downlink data of the UE; and the MME sends the third indication to an SGW, so that the SGW sends the third indication to the PGW, and further, the PGW processes the first data according to the third indication. By using this solution, if the UE satisfies the first preset condition, the MME sends a corresponding third indication to the SGW, so that the SGW further sends the third indication to the PGW, and further, when receiving the downlink data of the UE from a network, the PGW can buffer the downlink data of the UE for a long time according to the third indication, and does not send the downlink data to the SGW immediately. In this way, an error or exception may not be caused by the fact that the SGW needs to buffer the downlink data of the UE for a long time, thereby solving the problem in the prior art that, in order to save power, when the MME delays delivering a paging message or the UE uses a long DRX period, an exception may occur in the SGW.

Figure 11:
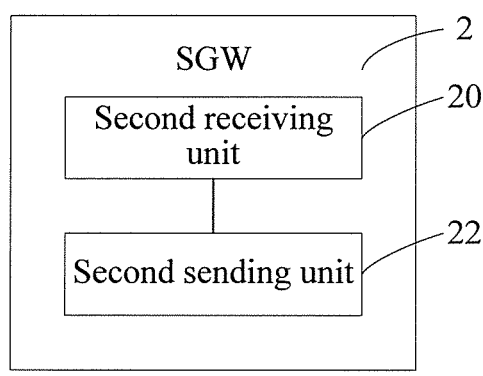
FIG. 11 is a second schematic structural diagram of an SGW according to an embodiment of the present invention.

As shown in FIG. 11, this embodiment of the present invention provides an SGW 2, corresponding to the another communications method on the SGW side provided in the embodiment of the present invention. The SGW 2 includes:

a second receiving unit 20, configured to receive a third indication from an MME, where the third indication is generated by the MME when the MME acquires information of a UE and determines, according to the information of the UE, that the UE satisfies a first preset condition, the third indication is used for instructing a PGW to retain first data, and the first data is downlink data of the UE; and a second sending unit 22, configured to send the third indication received by the second receiving unit 20 to the PGW, so that the PGW processes the first data according to the third indication.

Further, the third indication received by the second receiving unit 20 includes a third paging delaying instruction, and is used for instructing the PGW to determine a first time according to the third paging delaying instruction, retain the first data within the first time, and send the first data to the SGW after the first time;

or, the third indication received by the second receiving unit 20 includes a third suggested waiting time, and is used for instructing the PGW to retain the first data within the third suggested waiting time, and send the first data to the SGW after the third suggested waiting time;

or, the third indication received by the second receiving unit 20 includes the third paging delaying instruction and the third suggested waiting time, and is used for instructing the PGW to retain the first data within the third suggested waiting time after the PGW determines, according to the third paging delaying instruction, that the MME needs to delay paging the UE, and send the first data to the SGW after the third suggested waiting time;

or, the third indication received by the second receiving unit 20 includes the third paging delaying instruction and an EPS bearer identifier, and is used for instructing the PGW to determine the first time according to the third paging delaying instruction, retain, within the first time, the first data corresponding to the EPS bearer identifier, and send the first data corresponding to the EPS bearer identifier to the SGW after the first time;

or, the third indication received by the second receiving unit 20 includes the third suggested waiting time and the EPS bearer identifier, and is used for instructing the PGW to retain, within the third suggested waiting time, the first data corresponding to the EPS bearer identifier, and send the first data corresponding to the EPS bearer identifier to the SGW after the third suggested waiting time;

or, the third indication received by the second receiving unit 20 includes the third paging delaying instruction, the third suggested waiting time, and the EPS bearer identifier, and is used for instructing the PGW to retain, within the third suggested waiting time, the first data corresponding to the EPS bearer identifier after the PGW determines, according to the third paging delaying instruction, that the MME needs to delay paging the UE, and send the first data corresponding to the EPS bearer identifier to the SGW after the third suggested waiting time.

Further, the second receiving unit 20 is further configured to receive a fourth indication from the MME, where the fourth indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the fourth indication is used for instructing the PGW to normally transmit and receive the first data; and the second sending unit 22 is further configured to send the fourth indication received by the second receiving unit 20 to the PGW, so that the PGW processes the first data according to the fourth indication.

According to the SGW provided in this embodiment of the present invention, the SGW receives a third indication from an MME, where the third indication is generated by the MME when the MME acquires information of a UE and determines, according to the information of the UE, that the UE satisfies a first preset condition, the third indication is used for instructing a PGW to retain first data, the first data is downlink data of the UE; and the SGW sends the third indication to the PGW, so that the PGW processes the first data according to the third indication. By using this solution, if the UE satisfies the first preset condition, the MME sends a corresponding third indication to the SGW, so that the SGW further sends the third indication to the PGW, and further, when receiving the downlink data of the UE from a network, the PGW can buffer the downlink data of the UE for a long time according to the third indication, and does not send the downlink data to the SGW immediately. In this way, an error or exception may not be caused by the fact that the SGW needs to buffer the downlink data of the UE for a long time, thereby solving the problem in the prior art that, in order to save power, when the MME delays delivering a paging message or the UE uses a long DRX period, an exception may occur in the SGW.

Figure 12:
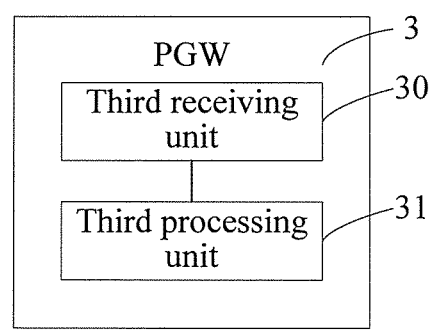
FIG. 12 is a first schematic structural diagram of a PGW according to an embodiment of the present invention.

As shown in FIG. 12, this embodiment of the present invention provides a PGW 3, corresponding to the another communications method on the PGW side provided in the embodiment of the present invention. The PGW 3 includes:

a third receiving unit 30, configured to receive a third indication from an SGW, where the third indication is generated by an MME when the MME acquires information of a UE and determines, according to the information of the UE, that the UE satisfies a first preset condition, and the third indication is sent by the MME to the SGW, the third indication is used for instructing the PGW to retain first data, and the first data is downlink data of the UE; and a third processing unit 31, configured to process the first data according to the third indication received by the third receiving unit 30.

Further, the third indication received by the third receiving unit 30 includes a third paging delaying instruction, and is used for instructing the third processing unit 31 to determine a first time according to the third paging delaying instruction and retain the first data within the first time, and is used for instructing a third sending unit 32 to send the first data to the SGW after the first time;

or, the third indication received by the third receiving unit 30 includes a third suggested waiting time, and is used for instructing the third processing unit 31 to retain the first data within the third suggested waiting time, and is used for instructing the third sending unit 32 to send the first data to the SGW after the third suggested waiting time;

or, the third indication received by the third receiving unit 30 includes the third paging delaying instruction and the third suggested waiting time, and is used for instructing the third processing unit 31 to retain the first data within the third suggested waiting time after the third processing unit 31 determines, according to the third paging delaying instruction, that the MME needs to delay paging the UE, and is used for instructing the third sending unit 32 to send the first data to the SGW after the third suggested waiting time;

or, the third indication received by the third receiving unit 30 includes the third paging delaying instruction and an EPS bearer identifier, and is used for instructing the third processing unit 31 to determine the first time according to the third paging delaying instruction and retain, within the first time, the first data corresponding to the EPS bearer identifier, and is used for instructing the third sending unit 32 to send the first data corresponding to the EPS bearer identifier to the SGW after the first time;

or, the third indication received by the third receiving unit 30 includes the third suggested waiting time and the EPS bearer identifier, and is used for instructing the third processing unit 31 to retain, within the third suggested waiting time, the first data corresponding to the EPS bearer identifier, and is used for instructing the third sending unit 32 to send the first data corresponding to the EPS bearer identifier to the SGW after the third suggested waiting time;

or, the third indication received by the third receiving unit 30 includes the third paging delaying instruction, the third suggested waiting time, and the EPS bearer identifier, and is used for instructing the third processing unit 31 to retain, within the third suggested waiting time, the first data corresponding to the EPS bearer identifier after the third processing unit 31 determines, according to the third paging delaying instruction, that the MME needs to delay paging the UE, and is used for instructing the third sending unit 32 to send the first data corresponding to the EPS bearer identifier to the SGW after the third suggested waiting time.

Further, the third receiving unit 30 is further configured to receive a fourth indication from the SGW, where the fourth indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the fourth indication is sent by the MME to the SGW, and the fourth indication is used for instructing the PGW to normally transmit and receive the first data; and the third processing unit 31 is further configured to process the first data according to the fourth indication received by the third receiving unit 30.

According to the PGW provided in this embodiment of the present invention, the PGW receives a third indication from an SGW, where the third indication is generated by an MME when the MME acquires information of a UE and determines, according to the information of the UE, that the UE satisfies a first preset condition, and the third indication is sent by the MME to the SGW, the third indication is used for instructing the PGW to retain first data, the first data is downlink data of the UE; and the PGW processes the first data according to the third indication. By using this solution, if the UE satisfies the first preset condition, the MME sends a corresponding third indication to the SGW, so that the SGW further sends the third indication to the PGW, and further, when receiving the downlink data of the UE from a network, the PGW can buffer the downlink data of the UE for a long time according to the third indication, and does not send the downlink data to the SGW immediately. In this way, an error or exception may not be caused by the fact that the SGW needs to buffer the downlink data of the UE for a long time, thereby solving the problem in the prior art that, in order to save power, when the MME delays delivering a paging message or the UE uses a long DRX period, an exception may occur in the SGW.

Embodiment 4

Figure 13:
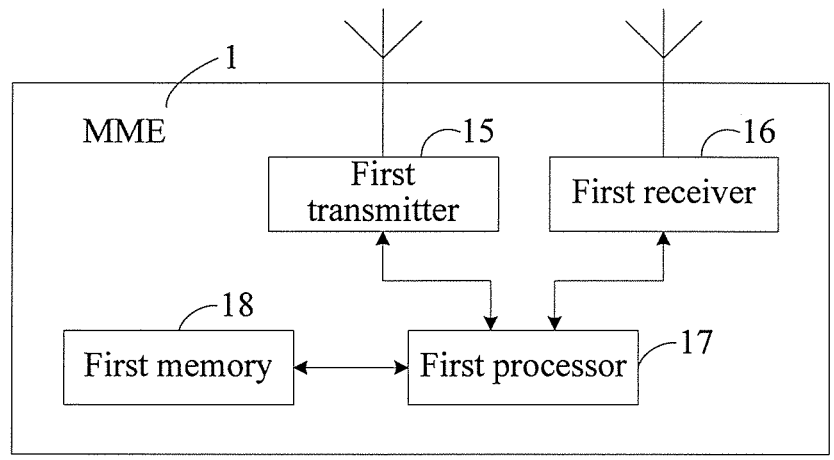
FIG. 13 is a third schematic structural diagram of an MME according to an embodiment of the present invention.

As shown in FIG. 13, this embodiment of the present invention provides an MME 1, corresponding to the communications method on the MME side provided in the embodiment of the present invention. The MME 1 includes a first transmitter 15, a first receiver 16, a first processor 17, and a first memory 18.

The first transmitter 15 may be configured to send an uplink signal to a network device such as a gateway. Especially, when the MME 1 receives a downlink data notification message from the gateway, the first transmitter 15 may send a downlink data notification acknowledgment message of the downlink data notification message to the gateway.

The first receiver 16 may be configured to receive a downlink signal from the network device such as the gateway. Especially, when the gateway delivers the downlink data notification message to the MME 1, the receiver 16 may receive the downlink data notification message from the gateway.

The first processor 17 is a control and processing center of the MME 1, runs a software program stored in the first memory 18, and invokes and processes data stored in the first memory 18, to control the MME 1 to transmit and receive a signal, and to implement another function of the MME 1.

The first memory 18 may be configured to store a software program and data, so that the first processor 17 may run the software program stored in the first memory 18, so as to implement a signal transmitting and receiving function of the MME 1 and another function of the MME 1.

Specifically, the first processor 17 acquires information of a UE, and stores the information of the UE into the first memory 18; the first processor 17 determines, according to the information of the UE, whether the UE satisfies a first preset condition; if the UE satisfies the first preset condition, the first processor 17 generates a first indication, and stores the first indication into the first memory 18, where the first indication is used for instructing an SGW to retain first data or discard the first data, and the first data is downlink data of the UE; and the first processor 17 instructs the first transmitter 15 to send the first indication to the SGW, so that the SGW processes the first data according to the first indication.

Further, the information of the UE acquired by the first processor 17 may include a type of the UE; and the first preset condition is that the UE is a power-saving UE; and the first processor 17 is configured to determine, according to the type of the UE, whether the UE is the power-saving UE.

Further, the information of the UE acquired by the first processor 17 may include a DRX period of the UE; and the first preset condition is that the DRX period of the UE is greater than a first preset threshold; and the first processor 17 is configured to determine, according to the DRX period of the UE, whether the DRX period of the UE is greater than the first preset threshold.

Further, the first indication generated by the first processor 17 includes a first paging delaying instruction, and is used for instructing the SGW to determine a first time according to the first paging delaying instruction and retain the first data within the first time, or is used for instructing the SGW to discard the first data according to the first paging delaying instruction;

or, the first indication generated by the first processor 17 includes a first suggested waiting time, and is used for instructing the SGW to retain the first data within the first suggested waiting time;

or, the first indication generated by the first processor 17 includes the first paging delaying instruction and the first suggested waiting time, and is used for instructing the SGW to retain the first data within the first suggested waiting time after the SGW determines, according to the first paging delaying instruction, that the MME needs to delay paging the UE;

or, the first indication generated by the first processor 17 includes the first paging delaying instruction and an EPS bearer identifier, and is used for instructing the SGW to determine the first time according to the first paging delaying instruction and retain, within the first time, the first data corresponding to the EPS bearer identifier, or is used for instructing the SGW to discard, according to the first paging delaying instruction, the first data corresponding to the EPS bearer identifier;

or, the first indication generated by the first processor 17 includes the first suggested waiting time and the EPS bearer identifier, and is used for instructing the SGW to retain, within the first suggested waiting time, the first data corresponding to the EPS bearer identifier;

or, the first indication generated by the first processor 17 includes the first paging delaying instruction, the first suggested waiting time, and the EPS bearer identifier, and is used for instructing the SGW to retain, within the first suggested waiting time, the first data corresponding to the EPS bearer identifier after the SGW determines, according to the first paging delaying instruction, that the MME needs to delay paging the UE.

Further, the first receiver 16 is configured to receive subscription data of the UE from an HSS, and the first processor 17 is configured to acquire the information of the UE according to the subscription data of the UE;

or, the first receiver 16 is configured to receive a NAS message/an AS message from the UE, and the first processor 17 is configured to acquire the information of the UE according to the NAS message/AS message of the UE;

or, the first processor 17 is configured to acquire the information of the UE according to a pre-configured QoS parameter of a bearer used by the UE.

Further, the first processor 17 is further configured to: if the subscription data of the UE, the QoS parameter of the bearer used by the UE, or a state of the UE changes, generate a second indication according to subscription data of the UE, a QoS parameter of the bearer used by the UE, or a state of the UE that is obtained after the change, and store the second indication into the first memory 18, where the second indication is used for instructing the SGW to normally transmit and receive the first data; and the first transmitter 15 is further configured to send the second indication stored by the first processor 17 into the first memory 18 to the SGW, so that the SGW processes the first data according to the second indication.

According to the MME provided in this embodiment of the present invention, the MME acquires information of a UE; the MME determines, according to the information of the UE, whether the UE satisfies a first preset condition; if the UE satisfies the first preset condition, the MME generates a first indication, where the first indication is used for instructing an SGW to retain first data or discard first data, and the first data is downlink data of the UE; and the MME sends the first indication to the SGW, so that the SGW processes the first data according to the first indication. By using this solution, if the UE satisfies the first preset condition, the MME sends a corresponding first indication to the SGW, so that when receiving the downlink data of the UE from a network, the SGW can buffer the downlink data of the UE for a long time according to the first indication. In this way, the SGW may not consider that buffering the downlink data of the UE for a long time is caused by the fact that an error or exception occurs, thereby solving the problem in the prior art that, in order to save power, when the MME delays delivering a paging message or the UE uses a long DRX period, an exception may occur in the SGW.

Figure 14:
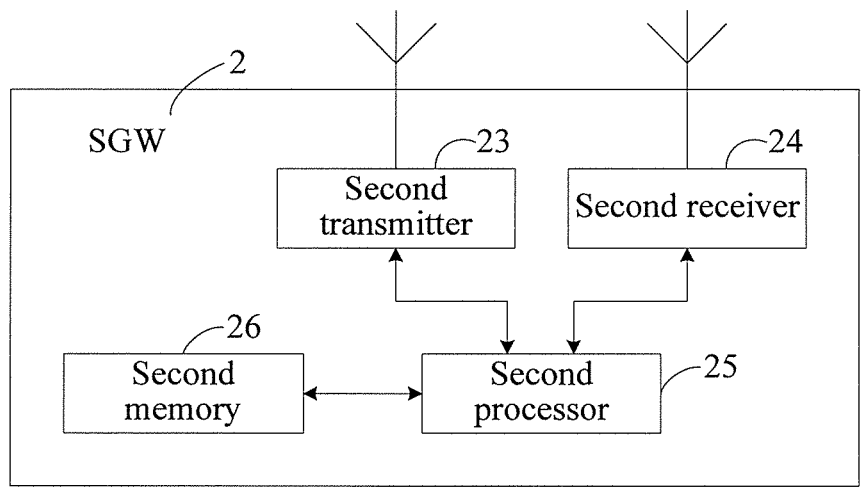
FIG. 14 is a third schematic structural diagram of an SGW according to an embodiment of the present invention.

As shown in FIG. 14, this embodiment of the present invention provides an SGW 2, corresponding to the communications method on the SGW side provided in the embodiment of the present invention. The SGW 2 includes a second transmitter 23, a second receiver 24, a second processor 25, and a second memory 26.

The second transmitter 23 may be configured to send a downlink signal to a network device such as an MME. Especially, when the SGW 2 needs to send a downlink data notification message to the MME, the second transmitter 23 may send the downlink data notification message to the MME.

The second receiver 24 may be configured to receive an uplink signal from the network device such as the MME. Especially, if the SGW 2 delivers the downlink data notification message to the MME, the second receiver 24 may receive a downlink data notification acknowledgment message from the MME, where the downlink data notification acknowledgment message corresponds to the downlink data notification message.

The second processor 25 is a control and processing center of the SGW 2, runs a software program stored in the second memory 26, and invokes and processes data stored in the second memory 26, to control the SGW 2 to transmit and receive a signal, and to implement another function of the SGW 2.

The second memory 26 may be configured to store a software program and data, so that the second processor 25 may run the software program stored in the second memory 26, so as to implement a signal transmitting and receiving function of the SGW 2 and another function of the SGW 2.

Specifically, the second processor 25 instructs the second receiver 24 to receive a first indication from the MME, and store the first indication into the second memory 26, where the first indication is generated by the MME when the MME acquires information of a UE and determines, according to the information of the UE, that the UE satisfies a first preset condition, the first indication is used for instructing the SGW 2 to retain first data or discard the first data, and the first data is downlink data of the UE; and the second processor 25 processes the first data according to the first indication.

Further, the first indication received by the second receiver 24 includes a first paging delaying instruction, and is used for instructing the second processor 25 to determine a first time according to the first paging delaying instruction and retain the first data within the first time, or is used for instructing the second processor to discard the first data according to the first paging delaying instruction;

or, the first indication received by the second receiver 24 includes a first suggested waiting time, and is used for instructing the second processor 25 to retain the first data within the first suggested waiting time;

or, the first indication received by the second receiver 24 includes the first paging delaying instruction and the first suggested waiting time, and is used for instructing the second processor 25 to retain the first data within the first suggested waiting time after the second processor 25 determines, according to the first paging delaying instruction, that the MME needs to delay paging the UE;

or, the first indication received by the second receiver 24 includes the first paging delaying instruction and an EPS bearer identifier, and is used for instructing the second processor 25 to determine the first time according to the first paging delaying instruction and retain, within the first time, the first data corresponding to the EPS bearer identifier, or is used for instructing the second processor 25 to discard, according to the first paging delaying instruction, the first data corresponding to the EPS bearer identifier;

or, the first indication received by the second receiver 24 includes the first suggested waiting time and the EPS bearer identifier, and is used for instructing the second processor 25 to retain, within the first suggested waiting time, the first data corresponding to the EPS bearer identifier;

or, the first indication received by the second receiver 24 includes the first paging delaying instruction, the first suggested waiting time, and the EPS bearer identifier, and is used for instructing the second processor 25 to retain, within the first suggested waiting time, the first data corresponding to the EPS bearer identifier after the second processor 25 determines, according to the first paging delaying instruction, that the MME needs to delay paging the UE.

Further, the second receiver 24 is further configured to receive a second indication from the MME, and the second processor 25 stores the second indication into the second memory 26, where the second indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the second indication is used for instructing the SGW to normally transmit and receive the first data; and the second processor 25 is further configured to process the first data according to the second indication, that is, instruct the second receiver 24 and the second transmitter 23 to normally transmit and receive the first data.

According to the SGW provided in this embodiment of the present invention, the SGW receives a first indication from an MME, where the first indication is generated by the MME when the MME acquires information of a UE and determines, according to the information of the UE, that the UE satisfies a first preset condition, the first indication is used for instructing the SGW to retain first data or discard first data, and the first data is downlink data of the UE; and the SGW processes the first data according to the first indication. By using this solution, if the UE satisfies the first preset condition, the MME sends a corresponding first indication to the SGW, so that when receiving the downlink data of the UE from a network, the SGW can buffer the downlink data of the UE for a long time according to the first indication. In this way, the SGW may not consider that buffering the downlink data of the UE for a long time is caused by the fact that an error or exception occurs, thereby solving the problem in the prior art that, in order to save power, when the MME delays delivering a paging message or the UE uses a long DRX period, an exception may occur in the SGW.

As shown in FIG. 13, this embodiment of the present invention provides an MME 1, corresponding to the communications method on the MME side provided in the embodiment of the present invention. The MME 1 includes a first transmitter 15, a first receiver 16, a first processor 17, and a first memory 18.

The first transmitter 15 may be configured to send an uplink signal to a network device such as a gateway. Especially, when the MME 1 receives a downlink data notification message from the gateway, the first transmitter 15 may send a downlink data notification acknowledgment message of the downlink data notification message to the gateway.

The first receiver 16 may be configured to receive a downlink signal from the network device such as the gateway. Especially, when the gateway delivers the downlink data notification message to the MME 1, the receiver 16 may receive the downlink data notification message from the gateway.

The first processor 17 is a control and processing center of the MME 1, runs a software program stored in the first memory 18, and invokes and processes data stored in the first memory 18, to control the MME 1 to transmit and receive a signal, and to implement another function of the MME 1.

The first memory 18 may be configured to store a software program and data, so that the first processor 17 may run the software program stored in the first memory 18, so as to implement a signal transmitting and receiving function of the MME 1 and another function of the MME 1.

Specifically, the first processor 17 acquires information of a UE, and stores the information of the UE into the first memory 18; the first processor 17 determines, according to the information of the UE, whether the UE satisfies a first preset condition; if the UE satisfies the first preset condition, the first processor 17 generates a third indication, and stores the third indication into the first memory 18, where the third indication is used for instructing a PGW to retain first data, and the first data is downlink data of the UE; and the first processor 17 instructs the first transmitter 15 to send the third indication to the SGW, so that the SGW sends the third indication to the PGW, and further, the PGW processes the first data according to the third indication.

Further, the information of the UE acquired by the first processor 17 may include a type of the UE; and the first preset condition is that the UE is a power-saving UE; and the first processor 17 is configured to determine, according to the type of the UE, whether the UE is the power-saving UE.

Further, the information of the UE acquired by the first processor 17 may include a DRX period of the UE; and the first preset condition is that the DRX period of the UE is greater than a first preset threshold; and the first processor 17 is configured to determine, according to the DRX period of the UE, whether the DRX period of the UE is greater than the first preset threshold.

Further, the third indication generated by the first processor 17 includes a third paging delaying instruction, and is used for instructing the PGW to determine a first time according to the third paging delaying instruction, retain the first data within the first time, and send the first data to the SGW after the first time;

or, the third indication generated by the first processor 17 includes a third suggested waiting time, and is used for instructing the PGW to retain the first data within the third suggested waiting time, and send the first data to the SGW after the third suggested waiting time;

or, the third indication generated by the first processor 17 includes the third paging delaying instruction and the third suggested waiting time, and is used for instructing the PGW to retain the first data within the third suggested waiting time after the PGW determines, according to the third paging delaying instruction, that the MME needs to delay paging the UE, and send the first data to the SGW after the third suggested waiting time;

or, the third indication generated by the first processor 17 includes the third paging delaying instruction and an EPS bearer identifier, and is used for instructing the PGW to determine the first time according to the third paging delaying instruction, retain, within the first time, the first data corresponding to the EPS bearer identifier, and send the first data corresponding to the EPS bearer identifier to the SGW after the first time;

or, the third indication generated by the first processor 17 includes the third suggested waiting time and the EPS bearer identifier, and is used for instructing the PGW to retain, within the third suggested waiting time, the first data corresponding to the EPS bearer identifier, and send the first data corresponding to the EPS bearer identifier to the SGW after the third suggested waiting time;

or, the third indication generated by the first processor 17 includes the third paging delaying instruction, the third suggested waiting time, and the EPS bearer identifier, and is used for instructing the PGW to retain, within the third suggested waiting time, the first data corresponding to the EPS bearer identifier after the PGW determines, according to the third paging delaying instruction, that the MME needs to delay paging the UE, and send the first data corresponding to the EPS bearer identifier to the SGW after the third suggested waiting time.

Further, the first receiver 16 is configured to receive subscription data of the UE from an HSS, and the first processor 17 is configured to acquire the information of the UE according to the subscription data of the UE;

or, the first receiver 16 is configured to receive a NAS message/an AS message from the UE, and the first processor 17 is configured to acquire the information of the UE according to the NAS message/AS message of the UE;

or, the first processor 17 is configured to acquire the information of the UE according to a pre-configured QoS parameter of a bearer used by the UE.

Further, the first processor 17 is further configured to: if the subscription data of the UE, the QoS parameter of the bearer used by the UE, or a state of the UE changes, generate a fourth indication according to subscription data of the UE, a QoS parameter of the bearer used by the UE, or a state of the UE that is obtained after the change, and store the fourth indication into the first memory 18, where the fourth indication is used for instructing the PGW to normally transmit and receive the first data; and the first transmitter 15 is further configured to send the fourth indication to the SGW, so that the SGW sends the fourth indication to the PGW, and further, the PGW processes the first data according to the fourth indication.

According to the MME provided in this embodiment of the present invention, the MME acquires information of a UE; the MME determines, according to the information of the UE, whether the UE satisfies a first preset condition; if the UE satisfies the first preset condition, the MME generates a third indication, where the third indication is used for instructing a PGW to retain first data, and the first data is downlink data of the UE; and the MME sends the third indication to an SGW, so that the SGW sends the third indication to the PGW, and further, the PGW processes the first data according to the third indication. By using this solution, if the UE satisfies the first preset condition, the MME sends a corresponding third indication to the SGW, so that the SGW further sends the third indication to the PGW, and further, when receiving the downlink data of the UE from a network, the PGW can buffer the downlink data of the UE for a long time according to the third indication, and does not send the downlink data to the SGW immediately. In this way, an error or exception may not be caused by the fact that the SGW needs to buffer the downlink data of the UE for a long time, thereby solving the problem in the prior art that, in order to save power, when the MME delays delivering a paging message or the UE uses a long DRX period, an exception may occur in the SGW.

As shown in FIG. 14, this embodiment of the present invention provides an SGW 2, corresponding to the communications method on the SGW side provided in the embodiment of the present invention. The SGW 2 includes a second transmitter 23, a second receiver 24, a second processor 25, and a second memory 26.

The second transmitter 23 may be configured to send a downlink signal to a network device such as an MME, and send an uplink signal to a network device such as a PGW. Especially, when the SGW 2 needs to send a downlink data notification message to the MME, the second transmitter 23 may send the downlink data notification message to the MME.

The second receiver 24 may be configured to receive an uplink signal from the network device such as the MME, and receive a downlink signal from the network device such as the PGW. Especially, if the SGW 2 delivers the downlink data notification message to the MME, the second receiver 24 may receive a downlink data notification acknowledgment message from the MME, where the downlink data notification acknowledgment message corresponds to the downlink data notification message.

The second processor 25 is a control and processing center of the SGW 2, runs a software program stored in the second memory 26, and invokes and processes data stored in the second memory 26, to control the SGW 2 to transmit and receive a signal, and to implement another function of the SGW 2.

The second memory 26 may be configured to store a software program and data, so that the second processor 25 may run the software program stored in the second memory 26, so as to implement a signal transmitting and receiving function of the SGW 2 and another function of the SGW 2.

Specifically, the second processor 25 instructs the second receiver 24 to receive a third indication from the MME, and store the third indication into the second memory 26, where the third indication is generated by the MME when the MME acquires information of a UE and determines, according to the information of the UE, that the UE satisfies a first preset condition, the third indication is used for instructing the PGW to retain first data, and the first data is downlink data of the UE; and the second processor 25 instructs the second transmitter 23 to send the third indication to the PGW, so that the PGW processes the first data according to the third indication.

The third indication received by the second receiver 24 includes a third paging delaying instruction, and is used for instructing the PGW to determine a first time according to the third paging delaying instruction, retain the first data within the first time, and send the first data to the SGW after the first time;

or, the third indication received by the second receiver 24 includes a third suggested waiting time, and is used for instructing the PGW to retain the first data within the third suggested waiting time, and send the first data to the SGW after the third suggested waiting time;

or, the third indication received by the second receiver 24 includes the third paging delaying instruction and the third suggested waiting time, and is used for instructing the PGW to retain the first data within the third suggested waiting time after the PGW determines, according to the third paging delaying instruction, that the MME needs to delay paging the UE, and send the first data to the SGW after the third suggested waiting time;

or, the third indication received by the second receiver 24 includes the third paging delaying instruction and an EPS bearer identifier, and is used for instructing the PGW to determine the first time according to the third paging delaying instruction, retain, within the first time, the first data corresponding to the EPS bearer identifier, and send the first data corresponding to the EPS bearer identifier to the SGW after the first time;

or, the third indication received by the second receiver 24 includes the third suggested waiting time and the EPS bearer identifier, and is used for instructing the PGW to retain, within the third suggested waiting time, the first data corresponding to the EPS bearer identifier, and send the first data corresponding to the EPS bearer identifier to the SGW after the third suggested waiting time;

or, the third indication received by the second receiver 24 includes the third paging delaying instruction, the third suggested waiting time, and the EPS bearer identifier, and is used for instructing the PGW to retain, within the third suggested waiting time, the first data corresponding to the EPS bearer identifier after the PGW determines, according to the third paging delaying instruction, that the MME needs to delay paging the UE, and send the first data corresponding to the EPS bearer identifier to the SGW after the third suggested waiting time.

Further, the second receiver 24 is further configured to receive a fourth indication from the MME, and the second processor 25 stores the fourth indication into the second memory 26, where the fourth indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the fourth indication is used for instructing the PGW to normally transmit and receive the first data; and the second transmitter 23 is further configured to send the fourth indication to the PGW, so that the PGW processes the first data according to the fourth indication.

According to the SGW provided in this embodiment of the present invention, the SGW receives a third indication from an MME, where the third indication is generated by the MME when the MME acquires information of a UE and determines, according to the information of the UE, that the UE satisfies a first preset condition, the third indication is used for instructing a PGW to retain first data, the first data is downlink data of the UE; and the SGW sends the third indication to the PGW, so that the PGW processes the first data according to the third indication. By using this solution, if the UE satisfies the first preset condition, the MME sends a corresponding third indication to the SGW, so that the SGW further sends the third indication to the PGW, and further, when receiving the downlink data of the UE from a network, the PGW can buffer the downlink data of the UE for a long time according to the third indication, and does not send the downlink data to the SGW immediately. In this way, an error or exception may not be caused by the fact that the SGW needs to buffer the downlink data of the UE for a long time, thereby solving the problem in the prior art that, in order to save power, when the MME delays delivering a paging message or the UE uses a long DRX period, an exception may occur in the SGW.

Figure 15:
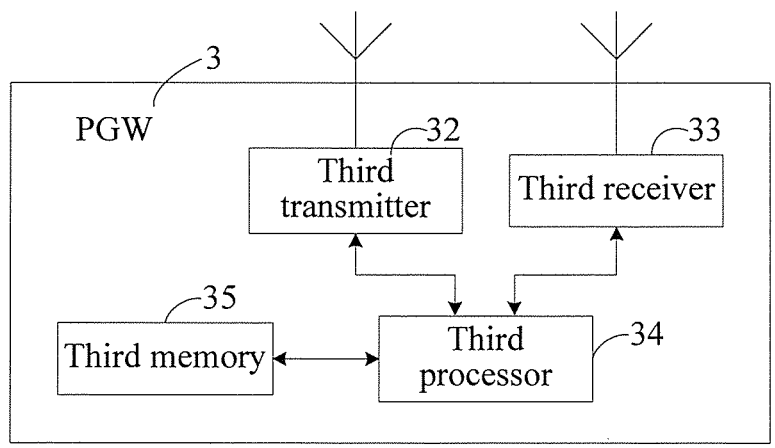
FIG. 15 is a second schematic structural diagram of a PGW according to an embodiment of the present invention.

As shown in FIG. 15, this embodiment of the present invention provides a PGW 3, corresponding to the communications method on the PGW side provided in the embodiment of the present invention. The PGW 3 includes a third transmitter 32, a third receiver 33, a third processor 34, and a third memory 35.

The third transmitter 32 may be configured to send a downlink signal to a network device such as an SGW. Especially, when the PGW 3 needs to send data to the SGW, the third transmitter 32 may send the data to the SGW.

The third receiver 33 may be configured to receive an uplink signal from the network device such as the SGW. Especially, when the PGW 3 delivers data to the SGW, the third receiver 33 may receive a acknowledgment message from the SGW, where the acknowledgment message corresponds to the data.

The third processor 34 is a control and processing center of the PGW 3, runs a software program stored in the third memory 35, and invokes and processes data stored in the third memory 35, to control the PGW 3 to transmit and receive a signal, and to implement another function of the PGW 3.

The third memory 35 may be configured to store a software program and data, so that the third processor 34 may run the software program stored in the third memory 35, so as to implement a signal transmitting and receiving function of the PGW 3 and another function of the PGW 3.

Specifically, the third processor 34 instructs the third receiver 33 to receive a third indication from the SGW, and store the third indication into the third memory 35, where the third indication is generated by the MME when the MME acquires information of a UE and determines, according to the information of the UE, that the UE satisfies a first preset condition, and the third indication is sent by the MME to the SGW, the third indication is used for instructing the PGW to retain first data, and the first data is downlink data of the UE; and the third processor 34 processes the first data according to the third indication.

Further, the third indication received by the third receiver 33 includes a third paging delaying instruction, and is used for instructing the third processor 34 to determine a first time according to the third paging delaying instruction and retain the first data within the first time, and is used for instructing the third transmitter 32 to send the first data to the SGW after the first time;

or, the third indication received by the third receiver 33 includes a third suggested waiting time, and is used for instructing the third processor 34 to retain the first data within the third suggested waiting time, and is used for instructing the third transmitter 32 to send the first data to the SGW after the third suggested waiting time;

or, the third indication received by the third receiver 33 includes the third paging delaying instruction and the third suggested waiting time, and is used for instructing the third processor 34 to retain the first data within the third suggested waiting time after the third processor 34 determines, according to the third paging delaying instruction, that the MME needs to delay paging the UE, and is used for instructing the third transmitter 32 to send the first data to the SGW after the third suggested waiting time;

or, the third indication received by the third receiver 33 includes the third paging delaying instruction and an EPS bearer identifier, and is used for instructing the third processor 34 to determine the first time according to the third paging delaying instruction and retain, within the first time, the first data corresponding to the EPS bearer identifier, and is used for instructing the third transmitter 32 to send the first data corresponding to the EPS bearer identifier to the SGW after the first time;

or, the third indication received by the third receiver 33 includes the third suggested waiting time and the EPS bearer identifier, and is used for instructing the third processor 34 to retain, within the third suggested waiting time, the first data corresponding to the EPS bearer identifier, and is used for instructing the third transmitter 32 to send the first data corresponding to the EPS bearer identifier to the SGW after the third suggested waiting time;

or, the third indication received by the third receiver 33 includes the third paging delaying instruction, the third suggested waiting time, and the EPS bearer identifier, and is used for instructing the third processor 34 to retain, within the third suggested waiting time, the first data corresponding to the EPS bearer identifier after the third processor 34 determines, according to the third paging delaying instruction, that the MME needs to delay paging the UE, and is used for instructing the third transmitter 32 to send the first data corresponding to the EPS bearer identifier to the SGW after the third suggested waiting time.

Further, the third receiver 33 is further configured to receive a fourth indication from the SGW, and the third processor 34 stores the fourth indication into the third memory 35, where the fourth indication is generated, if subscription data of the UE, a QoS parameter of a bearer used by the UE, or a state of the UE changes, by the MME according to subscription data of the UE, a QoS parameter of the bearer used by the UE, or a state of the UE that is obtained after the change, and the fourth indication is sent by the MME to the SGW, and the fourth indication is used for instructing the PGW to normally transmit and receive the first data; and the third processor 34 is further configured to process the first data according to the fourth indication, that is, instruct the third receiver 33 and the third transmitter 32 to normally transmit and receive the first data.

According to the PGW provided in this embodiment of the present invention, the PGW receives a third indication from an SGW, where the third indication is generated by an MME when the MME acquires information of a UE and determines, according to the information of the UE, that the UE satisfies a first preset condition, and the third indication is sent by the MME to the SGW, the third indication is used for instructing the PGW to retain first data, the first data is downlink data of the UE; and the PGW processes the first data according to the third indication. By using this solution, if the UE satisfies the first preset condition, the MME sends a corresponding third indication to the SGW, so that the SGW further sends the third indication to the PGW, and further, when receiving the downlink data of the UE from a network, the PGW can buffer the downlink data of the UE for a long time according to the third indication, and does not send the downlink data to the SGW immediately. In this way, an error or exception may not be caused by the fact that the SGW needs to buffer the downlink data of the UE for a long time, thereby solving the problem in the prior art that, in order to save power, when the MME delays delivering a paging message or the UE uses a long DRX period, an exception may occur in the SGW.

Embodiment 5

Figure 16:
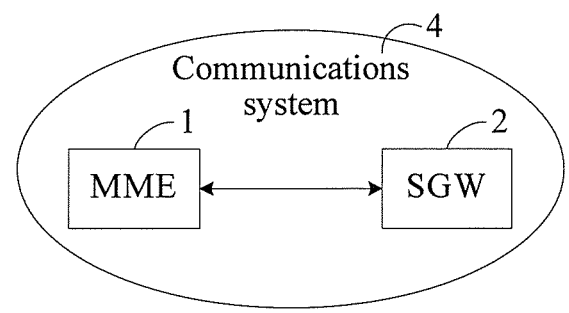
FIG. 16 is a first structural block diagram of a communications system according to an embodiment of the present invention.

As shown in FIG. 16, this embodiment of the present invention provides a communications system 4, corresponding to the communications method provided in the embodiment of the present invention. The communications system 4 includes the MME 1 and the SGW 2 provided in the foregoing embodiments. Structures of the MME 1 and the SGW 2 and methods corresponding to the structures have been described in the foregoing embodiments, which are not described herein again.

According to the communications system provided in this embodiment of the present invention, an MME acquires information of a UE; the MME determines, according to the information of the UE, whether the UE satisfies a first preset condition; if the UE satisfies the first preset condition, the MME generates a first indication, where the first indication is used for instructing an SGW to retain first data or discard first data, and the first data is downlink data of the UE; and the MME sends the first indication to the SGW, so that the SGW processes the first data according to the first indication. By using this solution, if the UE satisfies the first preset condition, the MME sends a corresponding first indication to the SGW, so that when receiving the downlink data of the UE from a network, the SGW can buffer the downlink data of the UE for a long time according to the first indication. In this way, the SGW may not consider that buffering the downlink data of the UE for a long time is caused by the fact that an error or exception occurs, thereby solving the problem in the prior art that, in order to save power, when the MME delays delivering a paging message or the UE uses a long DRX period, an exception may occur in the SGW.

Figure 17:
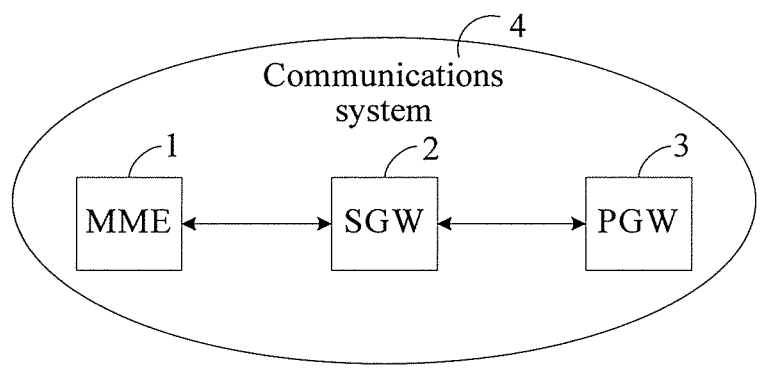
FIG. 17 is a second structural block diagram of a communications system according to an embodiment of the present invention.

As shown in FIG. 17, this embodiment of the present invention provides a communications system 4, corresponding to the another communications method provided in the embodiment of the present invention. The communications system 4 includes the MME 1, the SGW 2, and the PGW 3 provided in the foregoing embodiments. Structures of the MME 1, the SGW 2, and the PGW 3 and methods corresponding to the structures have been described in the foregoing embodiments, which are not described herein again.

According to the communications system provided in this embodiment of the present invention, an MME acquires information of a UE; the MME determines, according to the information of the UE, whether the UE satisfies a first preset condition; if the UE satisfies the first preset condition, the MME generates a third indication, where the third indication is used for instructing a PGW to retain first data, and the first data is downlink data of the UE; and the MME sends the third indication to an SGW, so that the SGW sends the third indication to the POW, and further, the PGW processes the first data according to the third indication. By using this solution, if the UE satisfies the first preset condition, the MME sends a corresponding third indication to the SGW, so that the SGW further sends the third indication to the PGW, and further, when receiving the downlink data of the UE from a network, the PGW can buffer the downlink data of the UE for a long time according to the third indication, and does not send the downlink data to the SGW immediately. In this way, an error or exception may not be caused by the fact that the SGW needs to buffer the downlink data of the UE for a long time, thereby solving the problem in the prior art that, in order to save power, when the MME delays delivering a paging message or the UE uses a long DRX period, an exception may occur in the SOW.

It may be clearly understood by a person skilled in the art that, for the purpose of convenient and brief description, division of the foregoing functional modules is used as an example for illustration. In an actual application, the foregoing functions may be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a atm of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communications method, comprising:
   acquiring, by a mobility management entity (MME), information of a user equipment (UE);
   determining, by the MME according to the information of the UE, whether the UE satisfies a first preset condition;
   when the UE satisfies the first preset condition, generating, by the MME, a first indication, wherein the first indication is used for instructing a serving gateway (SGW) to retain first data or discard first data, and the first data is downlink data of the UE; and
   sending, by the MME, the first indication to the SGW;
   wherein:
   the first indication comprises a first paging delaying instruction, and is used for instructing the SGW to determine a first time according to the first paging delaying instruction and retain the first data within the first time, or is used for instructing the SGW to discard the first data according to the first paging delaying instruction; or
   the first indication comprises a first suggested waiting time, and is used for instructing the SGW to retain the first data within the first suggested waiting time; or
   the first indication comprises a first paging delaying instruction and a first suggested waiting time, and is used for instructing the SGW to retain the first data within the first suggested waiting time after the SGW determines, according to the first paging delaying instruction, that the MME needs to delay paging the UE; or
   the first indication comprises a first paging delaying instruction and an evolved packet system (EPS) bearer identifier, and is used for instructing the SGW to determine a first time according to the first paging delaying instruction and retain, within the first time, the first data corresponding to the EPS bearer identifier, or is used for instructing the SGW to discard, according to the first paging delaying instruction, the first data corresponding to the EPS bearer identifier; or
   the first indication comprises a first suggested waiting time and a EPS bearer identifier, and is used for instructing the SGW to retain, within the first suggested waiting time, the first data corresponding to the EPS bearer identifier; or
   the first indication comprises a first paging delaying instruction, a first suggested waiting time, and a EPS bearer identifier, and is used for instructing the SGW to retain, within the first suggested waiting time, the first data corresponding to the EPS bearer identifier after the SGW determines, according to the first paging delaying instruction, that the MME needs to delay paging the UE.

2. The communications method according to claim 1, wherein:
   the information of the UE comprises a type of the UE;
   the first preset condition is that the UE is a power-saving UE; and
   determining, by the MME according to the information of the UE, whether the UE satisfies a first preset condition comprises:
   determining, by the MME according to the type of the UE, whether the UE is the power-saving UE.

3. The communications method according to claim 1, wherein:
   the information of the UE comprises a discontinuous reception (DRX) period of the UE;
   the first preset condition is that the DRX period of the UE is greater than a first preset threshold; and
   determining, by the MME according to the information of the UE, whether the UE satisfies a first preset condition comprises:
   determining, by the MME according to the DRX period of the UE, whether the DRX period of the UE is greater than the first preset threshold.

4. The communications method according to claim 1, wherein acquiring, by the MME, information of the UE comprises:
   receiving, by the MME, subscription data of the UE from a home subscriber server HSS, and acquiring the information of the UE according to the subscription data of the UE; or
   receiving, by the MME, a non access stratum (NAS) message/an access stratum (AS) message from the UE, and acquiring the information of the UE according to the NAS message/AS message of the UE; or acquiring, by the MME, the information of the UE according to a pre-configured quality of service QoS parameter of a bearer used by the UE.

5. The communications method according to claim 4, wherein the method further comprises:
   when the subscription data of the UE, the QoS parameter of the bearer used by the UE, or a state of the UE changes, generating, by the MME, a second indication according to subscription data of the UE, a QoS parameter of the bearer used by the UE, or a state of the UE that is obtained after the change, wherein the second indication is used for instructing the SGW to normally transmit and receive the first data; and
   sending, by the MME, the second indication to the SGW, so that the SGW processes the first data according to the second indication.

6. The communications method according to claim 4, wherein:
   the information of the UE comprises a type of the UE;
   the first preset condition is that the UE is a power-saving UE; and
   determining, by the MME according to the information of the UE, whether the UE satisfies a first preset condition comprises:
      determining, by the MME according to the type of the UE, whether the UE is the power-saving UE.

7. The communications method according to claim 4, wherein:
   the information of the UE comprises a discontinuous reception (DRX) period of the UE;
   the first preset condition is that the DRX period of the UE is greater than a first preset threshold; and
   determining, by the MME according to the information of the UE, whether the UE satisfies a first preset condition comprises:
      determining, by the MME according to the DRX period of the UE, whether the DRX period of the UE is greater than the first preset threshold.

8. A communications method, comprising:
   receiving, by a serving gateway (SGW), a first indication from a mobility management entity (MME), wherein the first indication is generated by the MME when the MME acquires information of a user equipment (UE) and determines, according to the information of the UE, that the UE satisfies a first preset condition, the first indication is used for instructing the SGW to retain first data or discard first data, and the first data is downlink data of the UE; and
   processing, by the SGW, the first data according to the first indication; wherein:
      the first indication comprises a first paging delaying instruction, and is used for instructing the SGW to determine a first time according to the first paging delaying instruction and retain the first data within the first time, or is used for instructing the SGW to discard the first data according to the first paging delaying instruction; or
      the first indication comprises a first suggested waiting time, and is used for instructing the SGW to retain the first data within the first suggested waiting time; or
      the first indication comprises a first paging delaying instruction and a first suggested waiting time, and is used for instructing the SGW to retain the first data within the first suggested waiting time after the SGW determines, according to the first paging delaying instruction, that the MME needs to delay paging the UE; or
      the first indication comprises a first paging delaying instruction and an evolved packet system (EPS) bearer identifier, and is used for instructing the SGW to determine a first time according to the first paging delaying instruction and retain, within the first time, the first data corresponding to the EPS bearer identifier, or is used for instructing the SGW to discard, according to the first paging delaying instruction, the first data corresponding to the EPS bearer identifier; or
      the first indication comprises a first suggested waiting time and a EPS bearer identifier, and is used for instructing the SGW to retain, within the first suggested waiting time, the first data corresponding to the EPS bearer identifier; or
      the first indication comprises a first paging delaying instruction, a first suggested waiting time, and a EPS bearer identifier, and is used for instructing the SGW to retain, within the first suggested waiting time, the first data corresponding to the EPS bearer identifier after the SGW determines, according to the first paging delaying instruction, that the MME needs to delay paging the UE.

9. The communications method according to claim 8, wherein the method further comprises:
   receiving, by the SGW, a second indication from the MME, wherein the second indication is generated, when subscription data of the UE, a quality of service (QoS) parameter of a bearer used by the UE, or a state of the UE changes, by the MME according to subscription data of the UE, a QoS parameter of the bearer used by the UE, or a state of the UE that is obtained after the change, and the second indication is used for instructing the SGW to normally transmit and receive the first data; and
   processing, by the SGW, the first data according to the second indication.

10. A mobility management entity (MME), comprising:
    a first processor, configured to:
       acquire information of a user equipment (UE),
       determine, according to the information of the UE, whether the UE satisfies a first preset condition; and
       when the UE satisfies the first preset condition, generate a first indication, wherein the first indication is used for instructing a serving gateway (SGW) to retain first data or discard first data, and the first data is downlink data of the UE;
    a first memory, configured to store the information of the UE acquired by the first processor and the first indication generated by the first processor; and
    a first transmitter, configured to send the first indication stored in the first memory and generated by the first processor to the SGW; wherein:
       the first indication generated by the first processor comprises a first paging delaying instruction, and is used for instructing the SGW to determine a first time according to the first paging delaying instruction and retain the first data within the first time, or is used for instructing the SGW to discard the first data according to the first paging delaying instruction; or
       the first indication generated by the first processor comprises a first suggested waiting time, and is used for instructing the SGW to retain the first data within the first suggested waiting time; or the first indication generated by the first processor comprises a first paging delaying instruction and a first suggested waiting time, and is used for instructing the SGW to retain the first data within the first suggested waiting time after the SGW determines, according to the first paging delaying instruction, that the MME needs to delay paging the UE; or the first indication generated by the first processor comprises a first paging delaying instruction and an evolved packet system (EPS) bearer identifier, and is used for instructing the SGW to determine a first time according to the first paging delaying instruction and retain, within the first time, the first data corresponding to the EPS bearer identifier, or is used for instructing the SGW to discard, according to the first paging delaying instruction, the first data corresponding to the EPS bearer identifier; or the first indication generated by the first processor comprises a first suggested waiting time and an EPS bearer identifier, and is used for instructing the SGW to retain, within the first suggested waiting time, the first data corresponding to the EPS bearer identifier; or the first indication generated by the first processor comprises a first paging delaying instruction, a first suggested waiting time, and a EPS bearer identifier, and is used for instructing the SGW to retain, within the first suggested waiting time, the first data corresponding to the EPS bearer identifier after the SGW determines, according to the first paging delaying instruction, that the MME needs to delay paging the UE.

11. The MME according to claim 10, wherein:
the information of the UE acquired by the first processor comprises a type of the UE;
the first preset condition is that the UE is a power-saving UE; and
the first processor is configured to determine, according to the type of the UE, whether the UE is the power-saving UE.

12. The MME according to claim 10, wherein:
the information of the UE acquired by the first processor comprises a discontinuous reception (DRX) period of the UE;
the first preset condition is that the DRX period of the UE is greater than a first preset threshold; and
the first processor is configured to determine, according to the DRX period of the UE, whether the DRX period of the UE is greater than the first preset threshold.

13. The MME according to claim 10, further comprising a first receiver, configured to:
receive subscription data of the UE from an HSS, and acquire the information of the UE according to the subscription data of the UE received by the first receiver; or
receive a non access stratum (NAS) message/an access stratum (AS) message from the UE, and acquire the information of the UE according to the NAS message/AS message of the UE received by the first receiver; or
acquire the information of the UE according to a pre-configured quality of service (QoS) parameter of a bearer used by the UE.

14. The MME according to claim 13, wherein:
the first processor is further configured to, when the subscription data of the UE, the QoS parameter of the bearer used by the UE, or a state of the UE changes, generate a second indication according to subscription data of the UE, a QoS parameter of the bearer used by the UE, or a state of the UE that is obtained after the change, and store the second indication into the first memory, wherein the second indication is used for instructing the SGW to normally transmit and receive the first data;
the first memory is configured to store the second indication generated by the first processor; and
the first transmitter is further configured to send the second indication stored in the first memory and generated by the first processor to the SGW.

15. The MME according to claim 13, wherein:
the information of the UE acquired by the first processor comprises a type of the UE;
the first preset condition is that the UE is a power-saving UE; and
the first processor is configured to determine, according to the type of the UE, whether the UE is the power-saving UE.

16. The MME according to claim 13, wherein:
the information of the UE acquired by the first processor comprises a discontinuous reception (DRX) period of the UE;
the first preset condition is that the DRX period of the UE is greater than a first preset threshold; and
the first processor is configured to determine, according to the DRX period of the UE, whether the DRX period of the UE is greater than the first preset threshold.

17. A serving gateway (SGW), comprising:
a second receiver, configured to receive a first indication from a mobility management entity (MME), wherein the first indication is generated by the MME when the MME acquires information of a user equipment (UE) and determines, according to the information of the UE, that the UE satisfies a first preset condition, the first indication is used for instructing the SGW to retain first data or discard first data, and the first data is downlink data of the UE;
a second processor, configured to store the first indication received by the second receiver into a second memory, and process the first data according to the first indication; and
the second memory, configured to store the first indication; wherein:
the first indication received by the second receiver comprises a first paging delaying instruction, and is used for instructing the second processor to determine a first time according to the first paging delaying instruction and retain the first data within the first time, or is used for instructing the second processor to discard the first data according to the first paging delaying instruction; or
the first indication received by the second receiver comprises a first suggested waiting time, and is used for instructing the second processor to retain the first data within the first suggested waiting time; or
the first indication received by the second receiver comprises a first paging delaying instruction and a first suggested waiting time, and is used for instructing the second processor to retain the first data within the first suggested waiting time after the second processor determines, according to the first paging delaying instruction, that the MME needs to delay paging the UE; or the first indication received by the second receiver comprises a first paging delaying instruction and an evolved packet service (EPS) bearer identifier, and is used for instructing the second processor to determine a first time according to the first paging delaying instruction and retain, within the first time, the first data corresponding to the EPS bearer identifier, or is used for instructing the second processor to discard, according to the first paging delaying instruction, the first data corresponding to the EPS bearer identifier; or the first indication received by the second receiver comprises a first suggested waiting time and an EPS bearer identifier, and is used for instructing the second processor to retain, within the first suggested waiting time, the first data corresponding to the EPS bearer identifier; or the first indication received by the second receiver comprises a first paging delaying instruction, a first suggested waiting time, and a EPS bearer identifier, and is used for instructing the second processor to retain, within the first suggested waiting time, the first data corresponding to the EPS bearer identifier after the second processor determines, according to the first paging delaying instruction, that the MME needs to delay paging the UE.

18. The SGW according to claim 17, wherein:

the second receiver is further configured to receive a second indication from the MME, wherein the second indication is generated, when subscription data of the UE, a quality of service (QoS) parameter of a bearer used by the UE, or a state of the UE changes, by the MME according to subscription data of the UE, a QoS parameter of the bearer used by the UE, or a state of the UE that is obtained after the change, and the second indication is used for instructing the SGW to normally transmit and receive the first data;

the second processor is further configured to store the second indication received by the second receiver into the second memory, and process the first data according to the second indication; and the second memory is further configured to store the second indication.

\* \* \* \* \*